United States Patent
Hoka et al.

(10) Patent No.: US 10,158,514 B2
(45) Date of Patent: Dec. 18, 2018

(54) METHOD AND APPARATUS FOR DESIGNING REFERENCE SIGNAL PATTERN IN MULTI-CELL MULTI-CARRIER SYSTEM

(71) Applicant: Samsung Electronics Co., Ltd., Gyeonggi-do (KR)

(72) Inventors: Ming Hoka, Suwon-si (KR); Kyeongyeon Kim, Hwaseong-si (KR); Keonkook Lee, Suwon-si (KR); Chanhong Kim, Suwon-si (KR); Taeyoung Kim, Seoul (KR); Jiyun Seol, Seongnam-si (KR); Yeohun Yun, Hwaseong-si (KR); Byunghwan Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/505,239

(22) PCT Filed: Mar. 7, 2016

(86) PCT No.: PCT/KR2016/002231
§ 371 (c)(1),
(2) Date: Feb. 20, 2017

(87) PCT Pub. No.: WO2016/144063
PCT Pub. Date: Sep. 15, 2016

(65) Prior Publication Data
US 2017/0366378 A1    Dec. 21, 2017

(30) Foreign Application Priority Data
Mar. 9, 2015    (KR) .................. 10-2015-0032548

(51) Int. Cl.
*H04L 27/26* (2006.01)
*H04L 25/02* (2006.01)
*H04L 5/00* (2006.01)

(52) U.S. Cl.
CPC .......... *H04L 27/264* (2013.01); *H04L 5/0007* (2013.01); *H04L 5/0023* (2013.01);
(Continued)

(58) Field of Classification Search
CPC ... H04L 5/0048; H04L 5/0051; H04L 5/0073; H04L 27/264; H04W 72/044
See application file for complete search history.

(56) References Cited

U.S. PATENT DOCUMENTS

2011/0038398 A1* 2/2011 Konno ................. H04B 1/7143
375/133
2012/0026936 A1* 2/2012 Zhang ................. H04B 7/2606
370/315

(Continued)

FOREIGN PATENT DOCUMENTS

KR    10-2012-0100857 A    9/2012
KR    10-2014-0035255 A    3/2014

OTHER PUBLICATIONS

Eeva Lahetkangas, "On the flexible 5G dense deployment air interface for mobile broadband," 5G for Ubiquitous Connectivity (5GU), 1st International Conference, Nov. 26-28, 2014, 6 pages, publisher IEEE, Piscataway, NJ.

(Continued)

*Primary Examiner* — David S Huang

(57) ABSTRACT

The present disclosure relates to a 5G or pre-5G communication system for supporting a higher data transfer rate than a 4G communication system such as LTE. The present invention relates to channel estimation and equalization in a cellular environment on the basis of an FBMC transmission and reception technique. A communication method of a base (Continued)

station according to one embodiment of the present invention may comprise the steps of: determining a reference signal (RS) pattern building block of a plurality of cells according to filter information of the plurality of cells; determining an RS pattern of the plurality of cells by using the determined RS pattern building block and the size of a resource block (RB); and transmitting, to a terminal, information about the determined RS pattern. According to one embodiment of the present invention, it is possible to provide a method and an apparatus for mapping a reference signal in a multi-cell environment.

15 Claims, 26 Drawing Sheets

(52) U.S. Cl.
CPC .......... *H04L 5/0037* (2013.01); *H04L 5/0048* (2013.01); *H04L 5/0051* (2013.01); *H04L 5/0073* (2013.01); *H04L 5/0094* (2013.01); *H04L 25/0204* (2013.01); *H04L 27/26* (2013.01); *H04L 27/261* (2013.01); *H04L 27/2671* (2013.01)

(56) References Cited

U.S. PATENT DOCUMENTS

| | | |
|---|---|---|
| 2014/0233437 A1 | 8/2014 | Abdoli et al. |
| 2016/0065390 A1* | 3/2016 | Kim .................... H04L 25/0224 375/260 |

OTHER PUBLICATIONS

Yuya Saito, "Non-Orthogonal Multiple Access (NOMA) for Cellular Future Radio Access," Vehicular Technology Conference (VTC Spring), 2013 IEEE 77th, Jun. 2-5, 2013, 6 pages.

* cited by examiner

1610

Antenna
port 0

FIG. 22
One antenna port
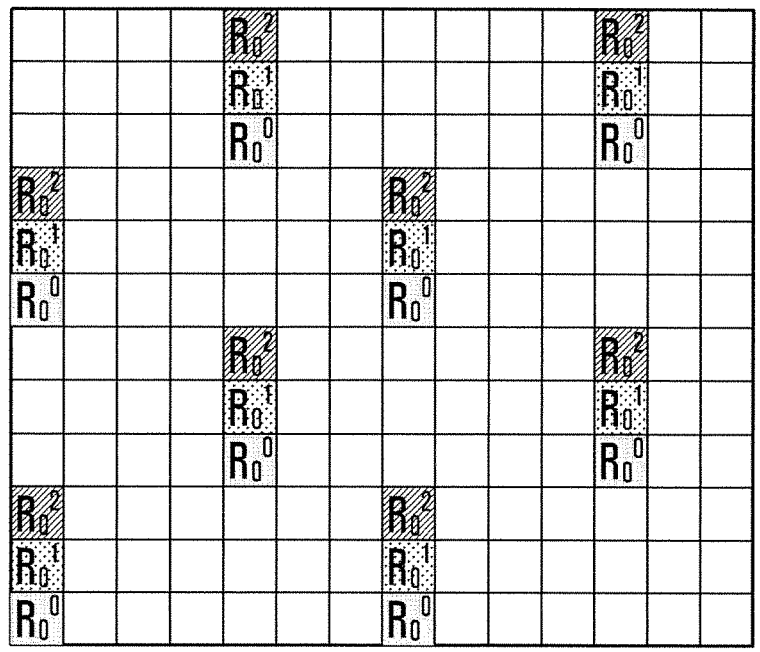
(a)
One antenna port
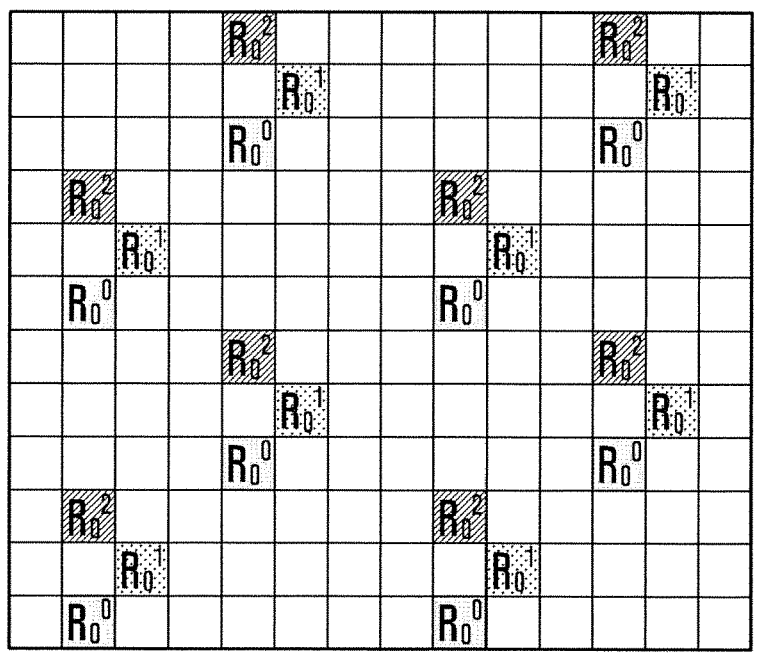
(b)

METHOD AND APPARATUS FOR DESIGNING REFERENCE SIGNAL PATTERN IN MULTI-CELL MULTI-CARRIER SYSTEM

TECHNICAL FIELD

The present invention relates to channel estimation and equalization based on a Filter-Bank Multi-Carrier (FBMC) communication scheme in a cellular environment and, in particular, to a reference signal mapping method and apparatus.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier(FBMC), non-orthogonal multiple access (NOMA), and sparse code multiple access (SCMA) as an advanced access technology have been developed.

In a multicarrier system, e.g. an Orthogonal Frequency Division Multiplexing (OFDM) system, the frequency tones or subcarriers are orthogonal among each other. Accordingly, the signals do not undergo inter-subcarrier interference in a complete synchronization state. In the Cyclic Prefix OFDM (CP-OFDM) technology in use for the Long Term Evolution (LTE) system, the subcarriers are configured to be orthogonal among each other. Such orthogonality simplifies system design and reduces complexity collocation.

Meanwhile, the next generation, i.e., 5G, LTE technology is focused on multicarrier systems, which may not insist on orthogonality. For example, the Filter-Bank Multi-Carrier (FBMC) system is characterized by modulating signals with filters and negating the orthogonality of subcarriers for enhanced spectral efficiency and spectrum confinement. Negating Cyclic Prefix (CP) and orthogonality can improve spectrum efficiency and diminish sensitivity to time and frequency offsets. The data are modulated by frequency subcarrier (e.g., M subcarriers), pass selected filter banks, and then Fourier-transformed. The length of an FBMC symbol is increased by L multiples of the original length by the filters through which the subcarriers pass. Accordingly, the length of an FBMC symbol, N, is equal to LM (N=LM) in the time domain. In the time domain, consecutive FBMC symbols are overlapped and summed. At this time, the number of symbols being overlapped may be determined depending on the modulation scheme. However, non-existence of frequency domain orthogonality may cause inter-subcarrier interference between neighboring cells using the same frequency subcarriers. Such inter-subcarrier interference may affect all functions of the FBMC system, e.g. channel estimation, synchronization, and equalization. In this case, the number of overlapped symbols may be equivalent to the number of interferer symbols. The FBMC symbols may be interfered with by the interferer symbols on respective frequency components.

FIG. 1 is a diagram illustrating an exemplary cooperative multipoint scenario, FIG. 2 is a diagram illustrating per-cell Cell-specific Reference Signal (CRS) resource mappings in an LTE system, FIG. 3 is a diagram illustrating CRS mapping in an LTE system, FIG. 4 is a diagram illustrating per-cell CRS resource mappings under assumption of FBMC, and FIG. 5 is a diagram illustrating an exemplary CRS resource mapping in a conventional technology under assumption of FBMC.

FIG. 1 shows a multi-cell environment. An access point or a base station (evolved Node B (eNB)) may communicate signals with terminals in cooperation at various levels. Such a scenario may include Coordinated Multi-Point (CoMP) in an LTE-advanced environment. In the case that all cells are cooperating among each other, it may be possible to perform joint transmission in which the terminal can receive signals from a plurality of access points. In a low cooperative situation, the terminal may switch between cells seamlessly through a dynamic cell selection operation. By performing user scheduling and beamforming determination in a cooperative manner, the UE may receive data through only the serving cells. At this time, signals from neighboring cells may act as interference that decreases cooperation gain.

For cooperative operation, channel information must be provided. Particularly in the LTE standard, CRS is used for channel quality measurement, rank-adaptive multiplexing, and closed loop and open loop multiplexing recommendation. In this case, the CRS is transmitted in a frequency-shift manner according to cell IDs of neighboring cells.

In reference to FIGS. 2 and 3, per-cell CRS resources are marked in the time-frequency domain. As shown in FIG. 2, the CRS 215 for the first cell (or cell 1) is mapped to the time-frequency resources as denoted by reference number 210. The CRS 225 for the second cell (or cell 2) and the CRS 235 for the third cell (or cell 3) are mapped to the time-frequency resources as denoted respectively by reference numbers 220 and 230. At this time, the CRSs of the neighboring cells are mapped without being overlapped as shown in the drawing. For example, the CRS 225 for the second cell is mapped to the resources in the state of being shifted on the frequency axis in comparison with the CRS 215 for the first cell and the CRS 235 for the third cell. Similarly, the CRS 235 for the third cell is mapped to the resource in the state of being shifted on the frequency axis in comparison with the CRS 215 for the first cell and the CRS 225 for the second cell. As a consequence, the per-cell CRSs are mapped in the frequency-time domain as denoted by reference number 350 in FIG. 3.

However, if the frequency shift in the RS pattern of the LTE system is applied to the FBMC system without modification, this may cause unsatisfactory channel estimation because of inter-subcarrier interference as described above. At this time, accurate interference may follow accurate design of the filter bank. Since the interference from the closest distance is the strongest interference, the symbol preceding another symbol in a multipath channel situation may undergo stronger interference. In reference to FIGS. 4 and 5, the signals in the respective resource blocks (RBs) may undergo interference caused by neighboring symbols in the frequency-time domain. For example, the CRS 415 for the first cell may be mapped to the resources as denoted by reference number 410 in FIG. 4. At this time, since no orthogonality is guaranteed in the FBMC system, the CRS may cause interference to the signals mapped to the neighboring resource elements as denoted by reference number 417. Likewise, the CRS 425 for the second cell and the CRS 435 for the third cell may cause interference to the signals mapped to the neighboring elements(427.437) as denoted respectively by reference numbers 420 and 430. As a consequence, if the CRS 455 is mapped to the resource in the state of being shifted in the multi-cell environment according to the conventional technology as denoted by reference number 450 of FIG. 5, the signals from the neighboring cells may act as interferences as denoted by reference number 457.

Even in the channel estimation method considering inter-subcarrier interference, e.g., pair-of-pilots method, interference approximation method (IAM), and interference pre-subtraction technique, only the intra-cell interference on the same channel is considered. This cannot be applied for multi-cell interference.

DISCLOSURE OF INVENTION

Technical Problem

The present invention has been proposed to solve the above problems and aims to provide a reference signal mapping method and apparatus for use in a multi-cell environment.

Also, the present invention aims to provide a method for mitigating inter-symbol and inter-cell interference in the time-frequency domain in the case of mapping multi-cell reference signals to resources.

Also, the present invention aims to improve a channel estimation result by mitigating inter-cell interference, satisfying the nested property of multi-antennas, negating overlap of per-antenna port reference signal symbols, and preventing reference signal symbols of different antenna ports from being mapped to the region where interference caused by other reference signal symbols is strong.

Also, the present invention aims to provide a method for determining specific frequency and time shift values according to cell identity information (cell-id).

Also, the present invention aims to provide a method for mapping cell-specific and antenna port-specific reference signals to the resources without overlapping.

Also, the present invention aims to provide a method for preventing cell-specific and antenna port-specific reference signals from being mapped to the storing interference regions.

Also, the present invention aims to provide a method for mapping reference signals to the resource blocks at the same reference signal density as the conventional technology.

The technical problems to be solved by the present invention are not restricted to the aforementioned, and those skilled in the art will clearly appreciate from the following description that other technical problems not mentioned so far may also be solved by the present invention.

Solution to Problem

In accordance with an aspect of the present invention, a communication method of a base station includes determining Reference Signal (RS) pattern building blocks of multiple cells according to per-cell filter information, configuring RS patterns of the cells based on the RS pattern blocks and a Resource Block (RB) size, and transmitting information on the RS patterns to a terminal.

In accordance with another aspect of the present invention, a communication method of a terminal includes receiving information on Reference Signal (RS) patterns of multiple cells from a base station and receiving RSs based on the information on the RS patterns, wherein the RS pattern information is determined based on RS pattern building blocks determined according to per-cell filter information and Resource Block (RB) size.

In accordance with another aspect of the present invention, a base station includes a communication unit which communicates with other network entities and a control unit which determines Reference Signal (RS) pattern building blocks of multiple cells according to per-cell filter information, configures RS patterns of the cells based on the RS pattern blocks and a Resource Block (RB) size, and controls transmitting information on the RS patterns to a terminal.

In accordance with still another aspect of the present invention, a terminal includes a communication unit which communicates with other network entities and a control unit which controls the communication unit to receive information Reference Signal (RS) patterns of multiple cells from a base station and receive RSs based on the information on the RS patterns, wherein the RS pattern information is determined based on RS pattern building blocks determined according to per-cell filter information and Resource Block (RB) size.

Advantageous Effects of Invention

An embodiment of the present invention provides a reference signal mapping method and apparatus in a multi-cell environment.

The multi-cell reference signal-resource mapping method and apparatus of the present invention is advantageous in terms of inter-symbol and inter-cell interference in the time-frequency domain.

The multi-cell reference signal-resource mapping method and apparatus of the present invention is advantageous in terms of improving channel estimation performance by mapping reference signal symbols in the time-frequency domain in such a way of mitigating mutual interference, satisfying multi-antenna aggregation property, negating overlap of different antenna port reference signal symbols, and preventing reference signal symbols of an antenna port from being mapped to a region in which significant interference is incurred from other reference signal symbols.

The multi-cell reference signal-resource mapping method and apparatus is advantageous in terms of determining specific frequency and time shift values per cell-id.

The multi-cell reference signal-resource mapping method and apparatus is advantageous in terms of mapping cell-specific reference signals and antenna port-specific reference signals in such a way that they are not being overlapped.

The multi-cell reference signal-resource mapping method and apparatus is advantageous in terms of preventing reference signals from being mapped to a region in which significant interference is caused by other reference signal symbols.

The multi-cell reference signal-resource mapping method and apparatus is advantageous in terms of mapping reference signals to resource blocks at the same reference signal density as the conventional method.

The advantages of the present invention are not limited to the aforesaid, and other advantages not described herein may be clearly understood by those skilled in the art from the descriptions below.

BRIEF DESCRIPTION OF DRAWINGS

FIGS. 22 to 24 are diagrams for explaining efficiency in the case of using a method according to an embodiment of the present invention;

MODE FOR THE INVENTION

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make clear the subject matter of the present invention.

Descriptions on the technical details well-known in the art and not related directly to the present disclosure are omitted herein to avoid obscuring the subject matter of the present invention. Exemplary embodiments of the present invention are described in detail with reference to the accompanying drawings. Further, the following terms are defined in consideration of the functionality in the present invention and may vary according to the intention of a user or an operator, usage, etc. Therefore, the definition should be made on the basis of the overall content of the present specification.

According to an embodiment of the present invention, an eNB may generate filter-specific and cell-specific Reference Signal (RS) pattern building block in a multi-cell system. The eNB may also configure an RS pattern based on the RS pattern building block. Although it is assumed that the RS is a Cell-specific RS (CRS) for convenience of explanation, the present invention is not limited thereby and can be applied to the system using a signal transmitted to the terminal through multiple cells.

First, a description is made of the method for generating an RS pattern building block.

Figure 1:
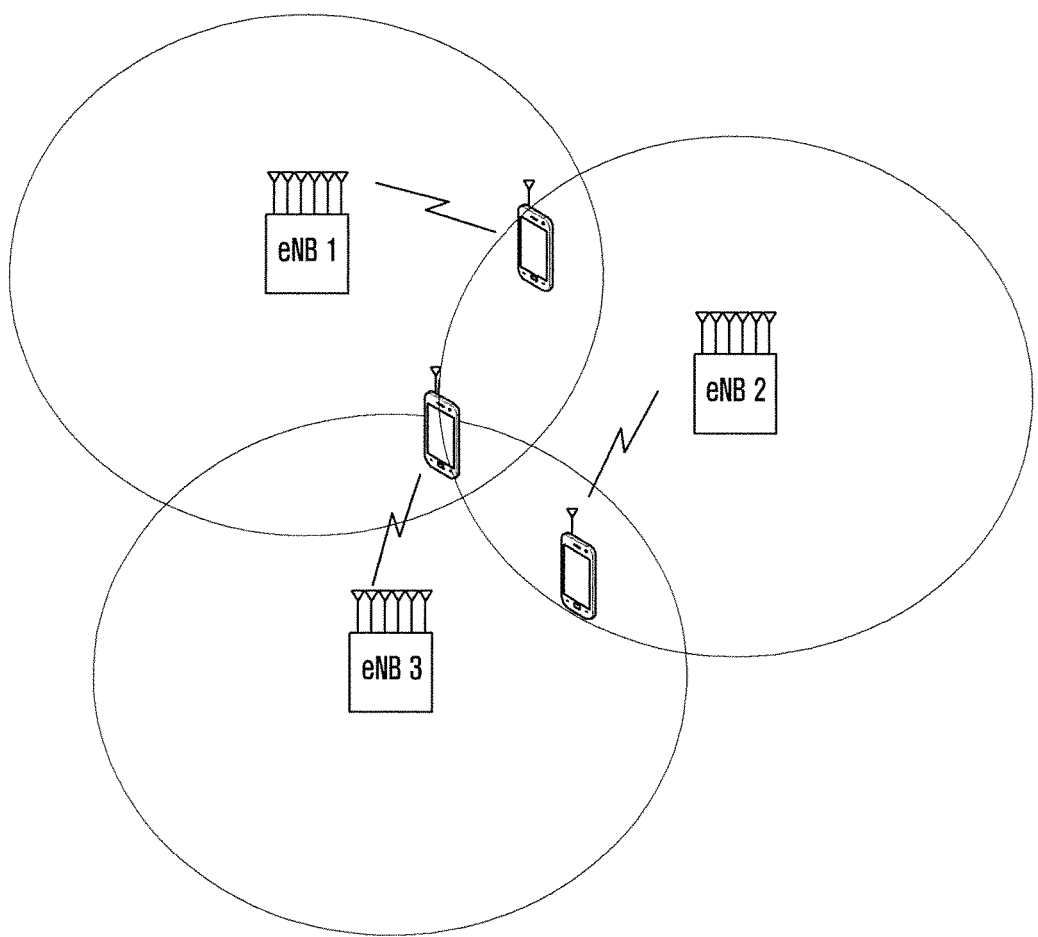
FIG. 1 is a diagram illustrating an exemplary cooperative multipoint scenario.
Figure 2:
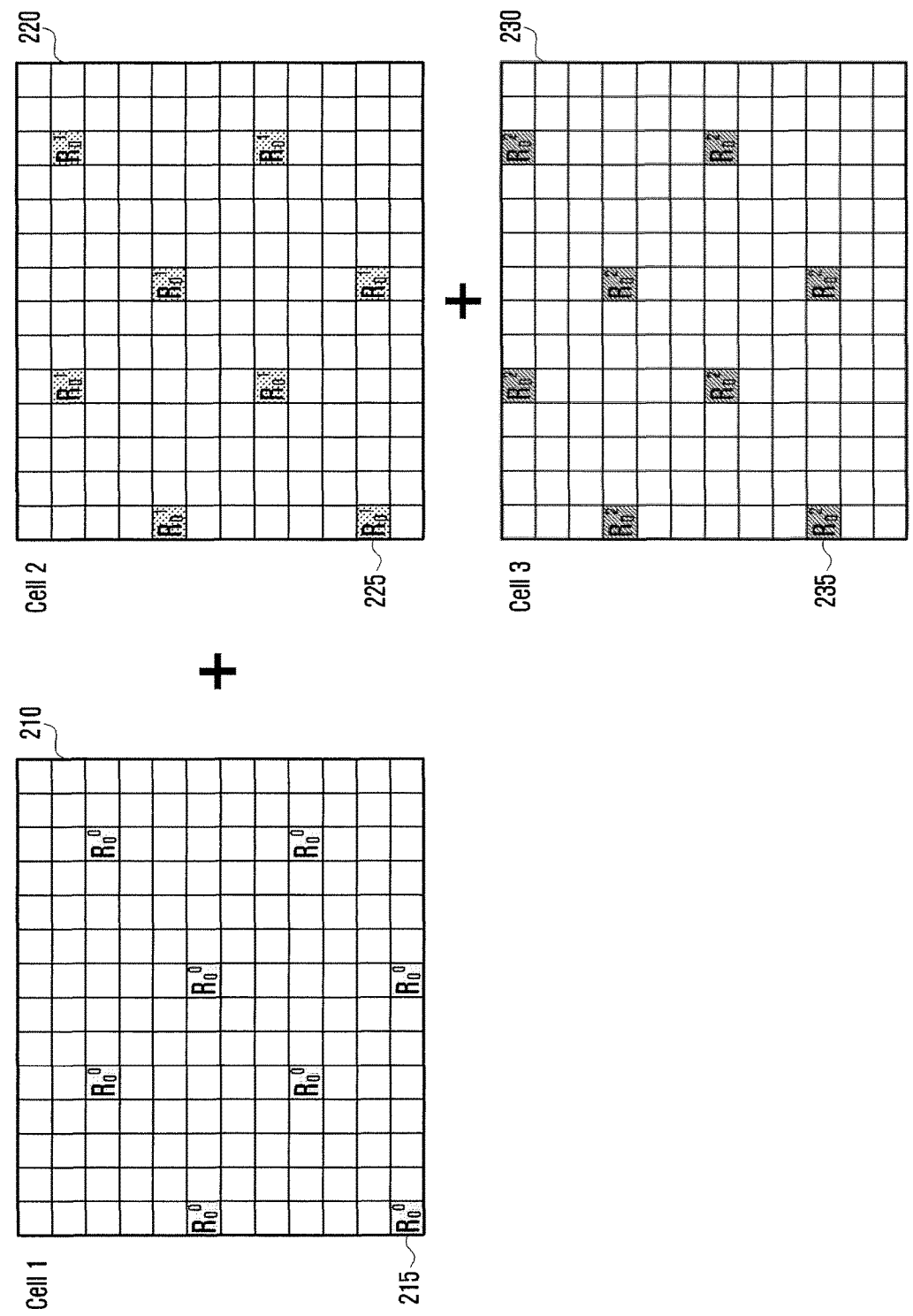
FIG. 2 is a diagram illustrating per-cell Cell-specific Reference Signal (CRS) resource mappings in an LTE system.
Figure 3:
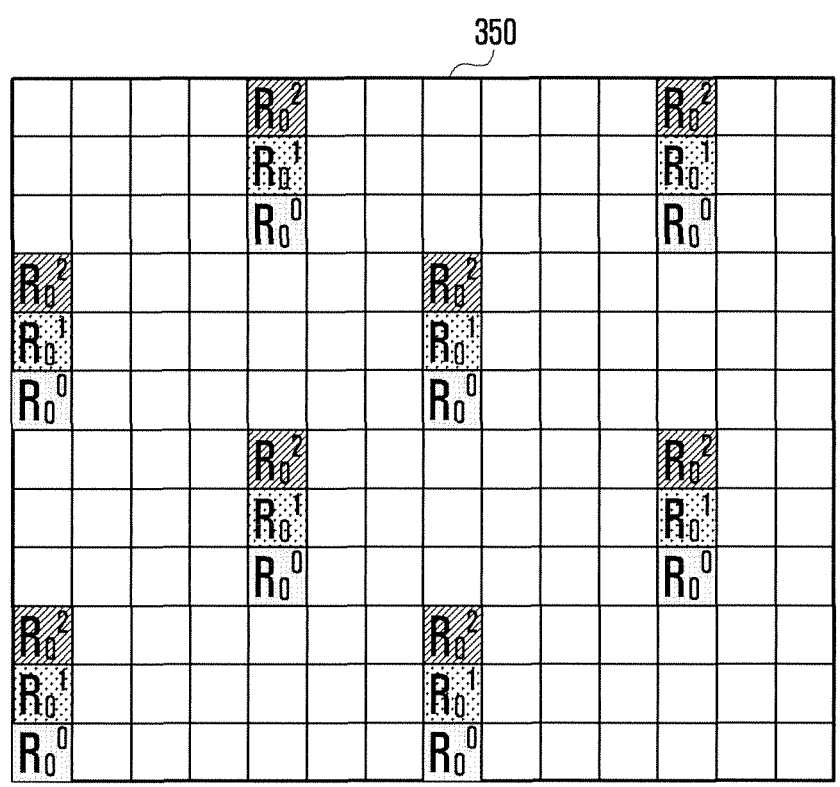
FIG. 3 is a diagram illustrating CRS mapping in an LTE system.
Figure 4:
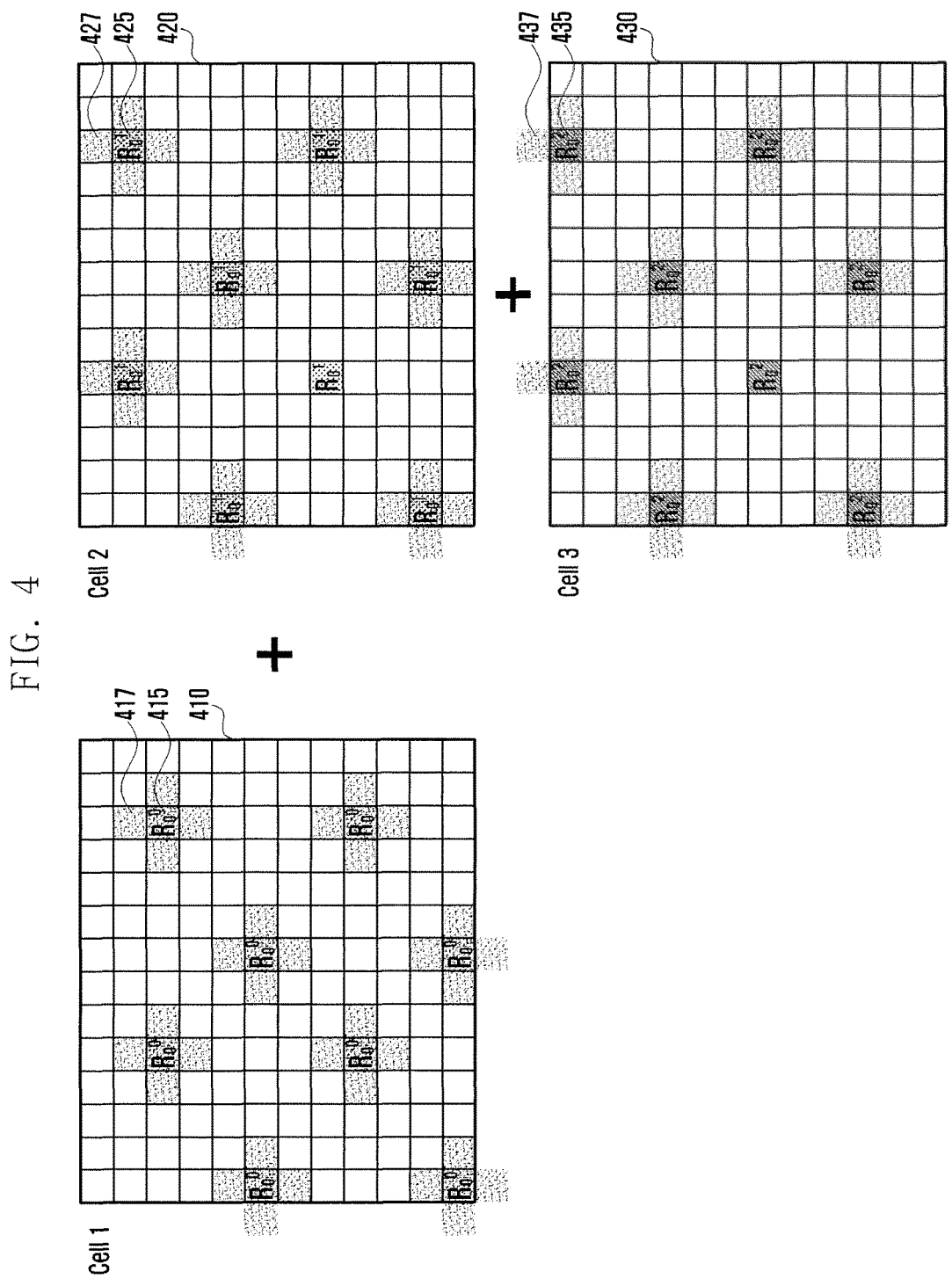
FIG. 4 is a diagram illustrating per-cell CRS resource mappings under assumption of FBMC.
Figure 5:
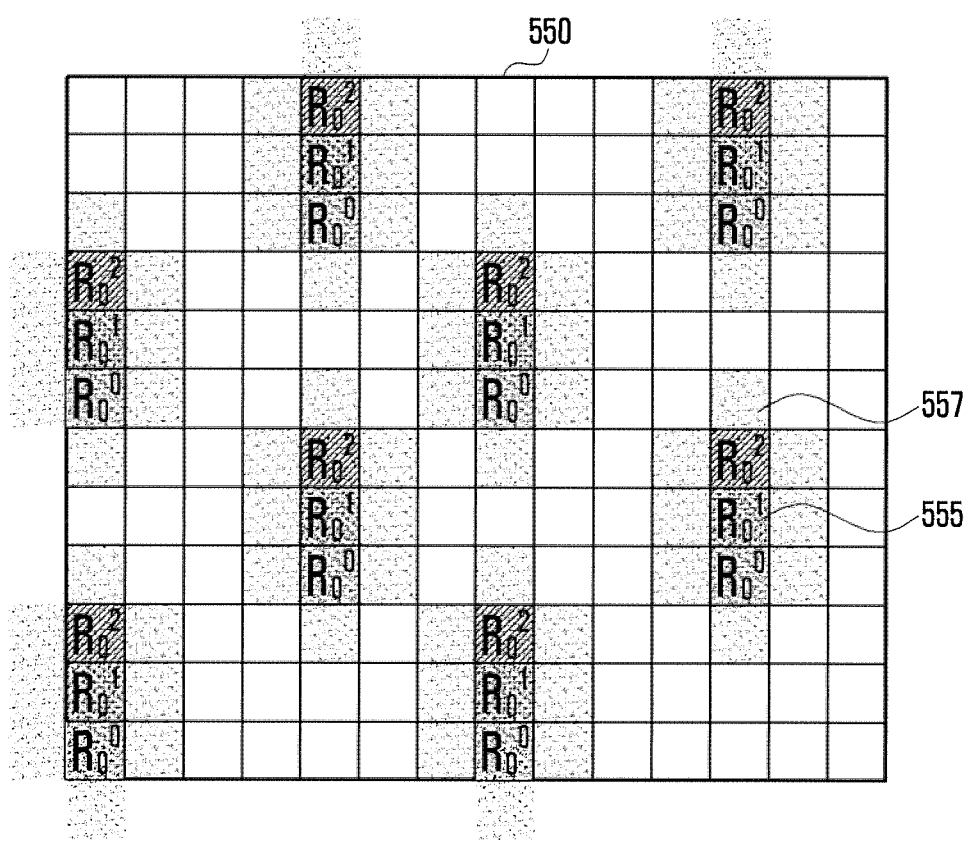
FIG. 5 is a diagram illustrating an exemplary CRS resource mapping in a conventional technology under assumption of FBMC.
Figure 6:
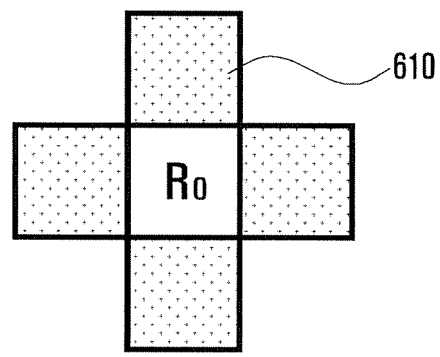
FIGS. 6 to 8 are diagrams for exemplifying RS densities according to an embodiment of the present invention.
Figure 7:
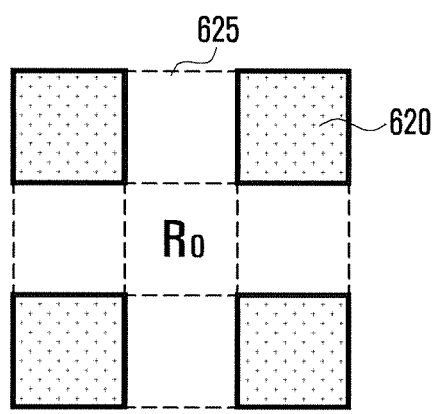
Figure 8:
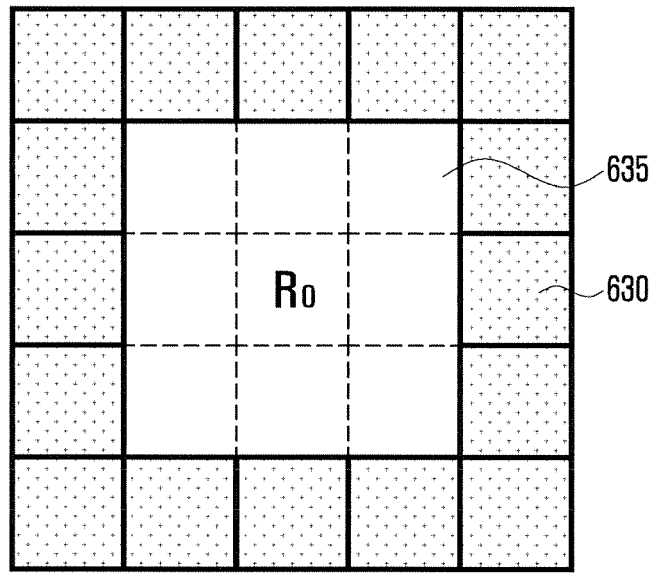
Figure 13:
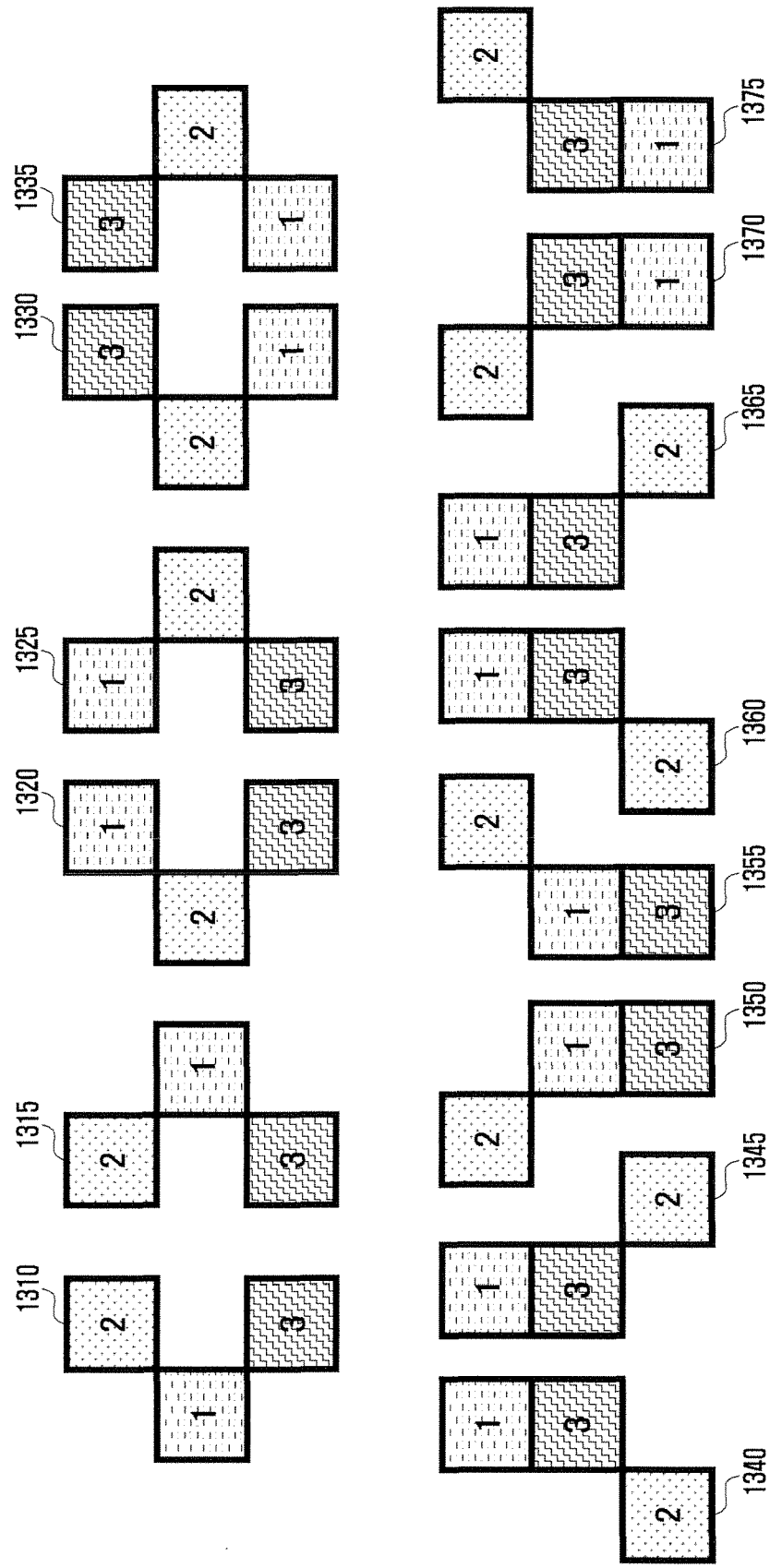
Figure 14:
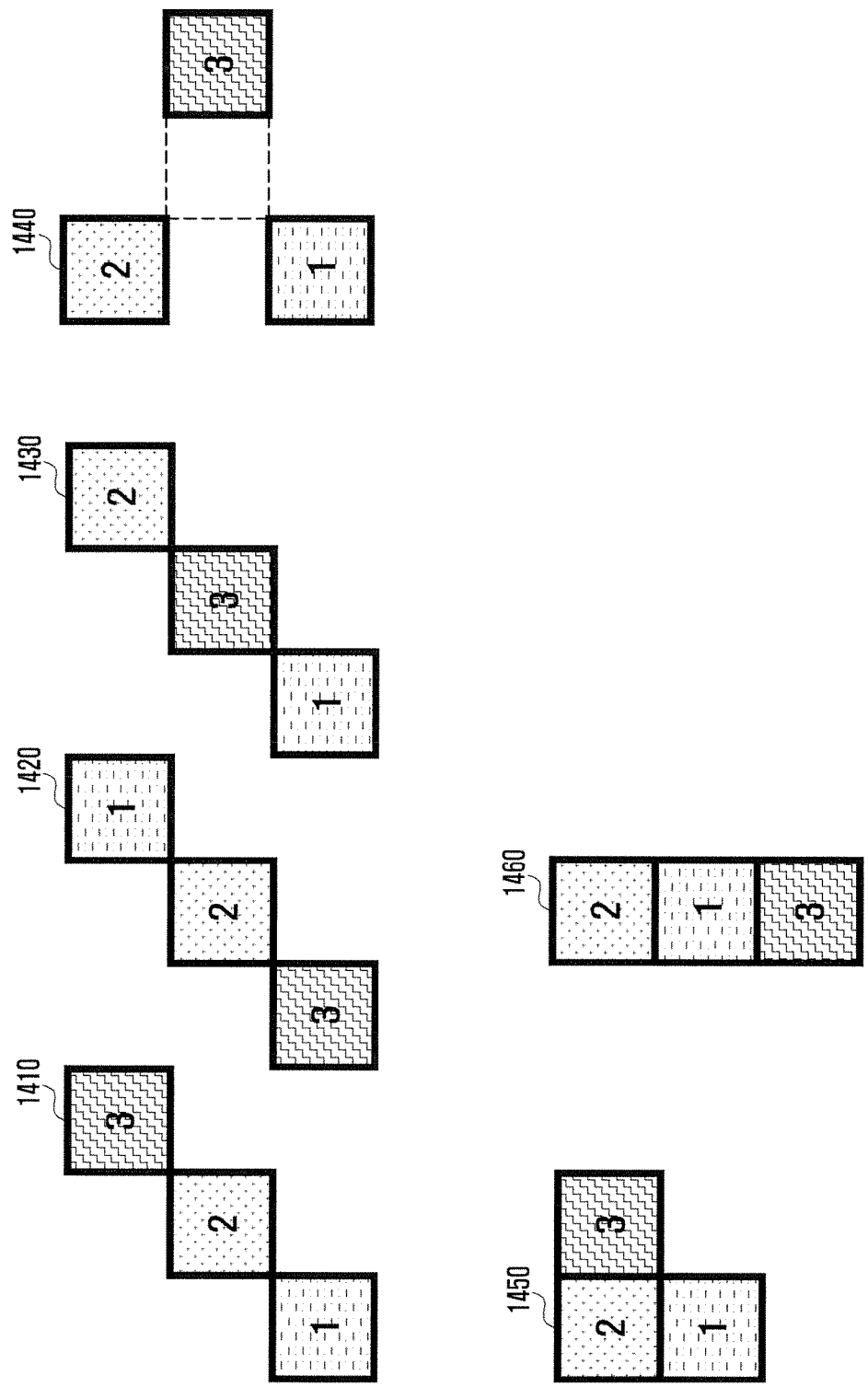
Figure 15:
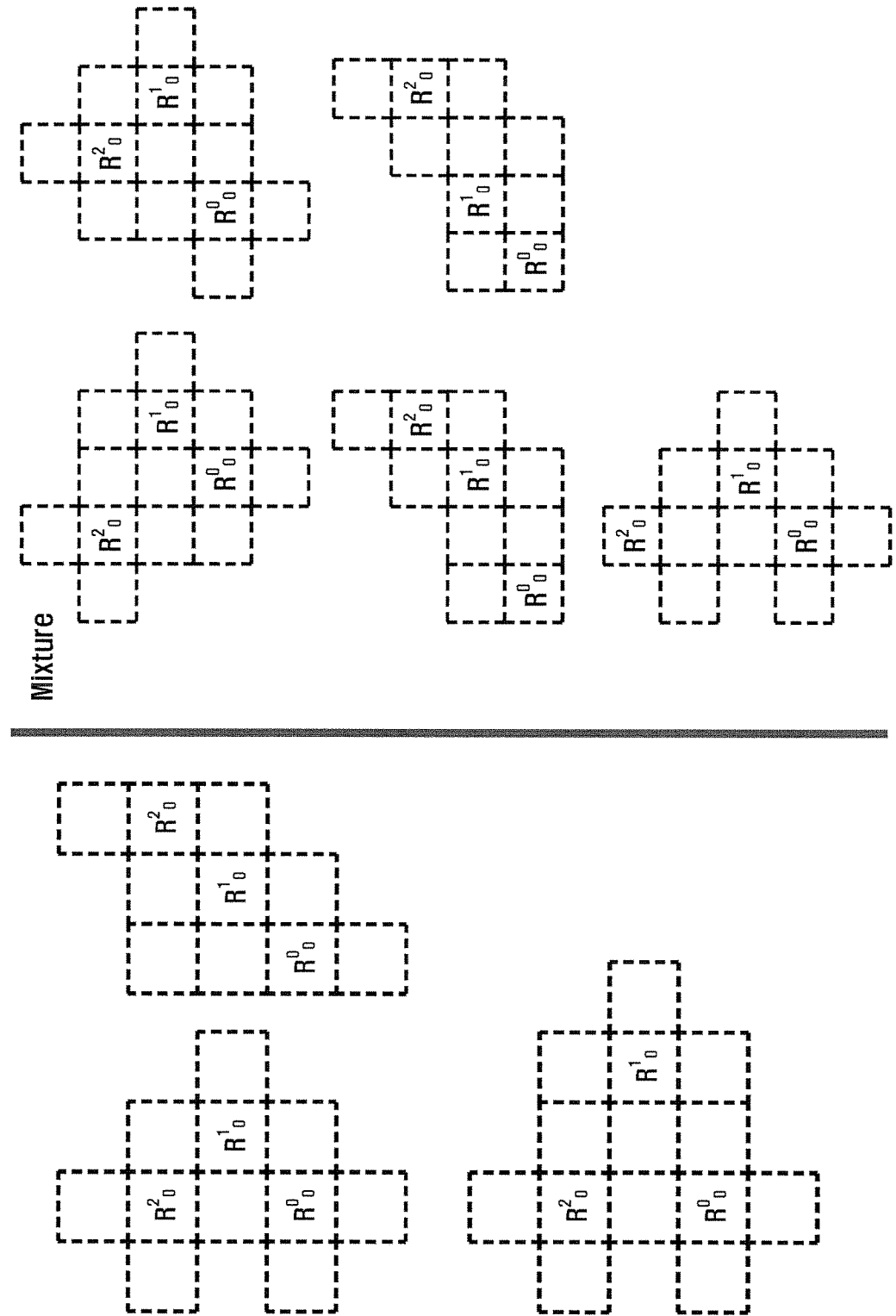
FIG. 15 is a diagram exemplifying multi-cell cooperative RS designs according to an embodiment of the present invention.

FIGS. 6 to 8 are diagrams for exemplifying RS densities according to an embodiment of the present invention, FIGS. 9 to 14 are diagrams for exemplifying RS patterns according to an embodiment of the present invention, and FIG. 15 is a diagram exemplifying multi-cell cooperative RS designs according to an embodiment of the present invention.

According to an embodiment of the present invention, it is possible to generate interference-cognitive RS pattern building blocks. At this time, per-filter RS position candidate regions may be configured. That is, a position to which an RS is mapped may be determined in consideration of an interference amount per filter selected for each cell.

In more detail, each cell may be configured with a set of filters. For example, the filter set may include a strong interference-resistive filter, a weak interference resistive filter, and an intermediate interference-resistive filter. This filter set may be defined as a CRS_filter_set and expressed as CRS_filterset=(f1, f2, f3). The filters have a relationship of f1<f2<f3 in an ascending order of interference amount.

Meanwhile, an interference threshold (t) may be defined. Such an interference threshold may be defined based on the operation assessment, system requirements, or interference limit requirements. The interference threshold aims to assess how much interference a filter incurs in the time-frequency domain.

For example, the interference threshold (t) may have 3 values of t1, t2, and t3. The amount of interference a filter incurs in the time-frequency domain, i.e. the interference value, may be acquired by performing measurement around the RS. In reference to FIG. 6, it may be possible to measure interference at the shaded regions 610 around the region of RS referred to as R0 and sum the measurement result values, the sum being defined as a first interference value (f1). That is, if the region of R0 is expressed as (0, 0), the first interference value (f1) may be a value acquired by summing the interference at the regions (0, 1), (0, −1), (1, 0), and (−1, 0). It may also be possible to determine whether the first interference value (f1) for the first interference at first interference candidate region 610 is less than the first interference threshold value (t1). If it is determined that the first interference value (f1) is less than the first interference threshold value (t1) (f1<t1 or f1≤t1), the filter may be defined as a first filter class (or filter class 1). Meanwhile, the term "filter class" may be interchangeably used with, but not limited to, the term "RS density" to indicate that the RS arrangement degree varies. However, the term "filter class" is used herein for convenience of explanation.

Likewise, a value obtained by summing the interference at the regions (1, 0), (1, 1), (0, 1), (−1, 1), (−1, 0), (−1, −1), (0, −1), and (−1, −1) around R0 may be defined as a second interference value (f2). If the second interference value (f2) is equal to or greater than the first interference threshold value (t1) and less than the second interference threshold (t2) (t1≤f2<t2) (f2 may be greater than t1 or equal to or less than t2 depending on the embodiment), the filter may be defined as a second filter class (or filter class 2). Also, a value obtained by summing the interference at the regions (1, 0), (1, 1), (0, 1), (−1, 1), (−1, 0), (−1, −1), (0, −1), (−1, −1), (2, 0), (2, 1), (2, 2), (1, 2), (1, 2), (0, 2), (−1, 2), (−2, 2), (−2, 1), (−2, 0), (−2, −1), (−2, −2), (−1, −2), (0, −2), (1, −2), and (2, −2) around R0 may be defined as a third interference value (f3). If the third interference value (f3) is equal to or greater than the second interference threshold value (t2) and less than the third interference threshold value (t3) (t2≤f3<t3) (f3 may be greater than t2 or equal to or less than t3 depending on the embodiment), the filter may be defined as a third filter class (or filter class 3). If the third interference value (f3) is equal to or greater than the third interference threshold value (t3≤f3 or t3<f3), the filter may be defined as a fourth filter class (or filter class 4). However, the above definitions are just examples, and they may be similarly defined with other terms such as fifth filter class, sixth filter class, $n^{th}$ class, and the like.

In this case, the filter-specific RS position candidate regions may be determined based on the filter class. That is, the RS position candidate regions may be configured according to the interference value of the filter.

In the example of FIG. 6, the shaded regions 610 may be the RS position candidate regions for the first filter class. That is, if the first RS position candidate region (P1) is expressed as (0, 0), it may be possible to express P1={(0,1), (1,0), (−1,0), (0,−1)}.

If the filter is categorized into the second filter class, the shaded regions 620 of FIG. 7 may be the RS position candidate regions. That is, if the filter is categorized into the second filter class, the second RS position candidate regions P2 may be positioned at a neighboring region of the interference candidate regions 625 around R0. That is, the second RS position candidate regions (P2) may be expressed as P2={(1,1), (−1,1), (−1,−1), (1,−1)}.

If the filter is categorized into the third filter class, the shaded regions 630 of FIG. 8 may be the RS position candidate regions. In this case, the third RS position candidate regions P3 may surround the interference candidate regions 635 around R0. That is, the third RS position candidate region (P3) may be expressed as P3={(2,0), (2,1), (2,2), (1,2), (0,2), (−1,2), (−2,2), (−2,1), (−2,0), (−2,−1), (−2,−2), (−1,−2), (0,−2), (1,−2), (2,−2), (2,−1)}. Although not shown, if the filter is categorized into the fourth filter class, the fourth RS position candidate regions (P4) may be expressed as P4={(3,0), (3,1), (3,2), (3,3), (2,3), (1,3), (0,3), (−1,3), (−2,3), (−3,3), (−3,2), (−3,1), (−3,0), (−3,−1), (−3,−2), (−3,−3), (−2,−3), (−1,−3), (0,−3), (1,−3), (2,−3), (3,−3), (3,−2), (3,−1)}.

Meanwhile, in a multi-cell environment, e.g. coordinative multipoint (CoMP) environment, N cells may cooperate. In this case, the cells may use the same filter set including f1, f2, . . . , fk(2≤k). Here, the filter used by the cell 1 may be expressed as Fi. For example, if cell 1 uses the filter f2, it may be possible to express F1=f2. At this time, the filter class of cell 1 may be expressed as Gi. For example, if cell 1 uses the filter f2 of filter class 1, it may be possible to express F1=f2, G1=1.

In this case, an RS pattern building block (or CRS pattern building block) generation algorithm generates the blocks in the order of the first cell, second cell, third cell, and so on. The RS pattern building block algorithm determines the relative positions of the RS of a cell in relation to the RS (or CRS) of the first cell.

In association with the CRS pattern building block generation algorithm, the CRS positions (CRS_BLK) may be defined as (0, 0). The position is one block corresponding to an RE position of the first cell. It may be possible to designate the CRS positions of the cells from m=1 to N.

TABLE 1

For m = 1 to N
    For each element in CRS_BLK:
        For k = 1 to m−1
            If Gk < Gm+1 then the RE positions in interference region less than Gm+1 are eliminated.
            If Gk >= Gm+1 then the RE positions in interference region less than Gk are eliminated.
        End
    The RE positions that are not eliminated are appended to the element
End In reference to FIGS. 9 and 10, if there are first, second, and third cells of which filters are all categorized into filter class 1 (G1=1, G2=1, and G3=1), the eNB may determine CRS pattern blocks. That is, the eNB may determine a CRS pattern based on the cell ID and filter class. If the filter class of the cell is x, the CRS position candidate regions of the other cells may be the RS position candidate regions at which the filter class is greater than or equal to x. For example, if the first cell is the reference cell, the CRS position candidate regions of the second and third cells may be the first, second, and third CRS position candidate regions because the filter class of the first cell is 1. Likewise, if the second cell is the reference cell, the CRS position candidate regions of the first and third cells may be the first, second, and third CRS position candidate regions because the filter class of the second cell is 1. Likewise, if the third cell is the reference cell, the CRS position candidate regions of the first and third cells may be the first, second, and third CRS position candidate regions because the filter class of the third cell is 1. Accordingly, the eNB may determine the most compact pattern. The determined pattern may be transmitted to the terminal (broadcast).

Figure 9:
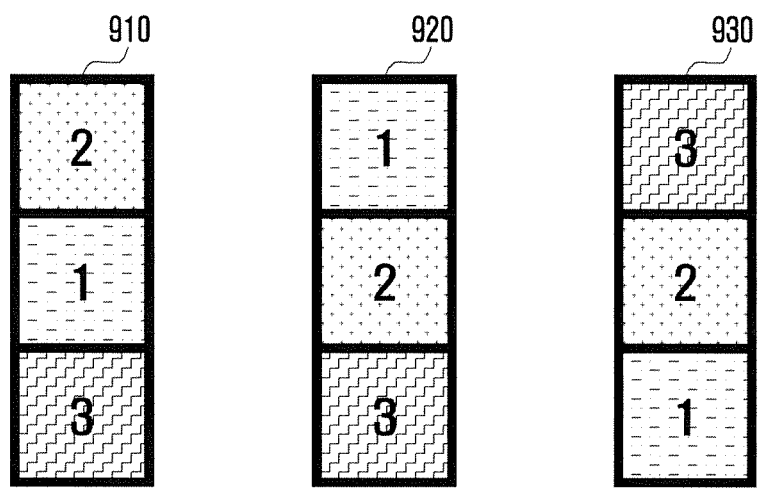
FIGS. 9 to 14 are diagrams for exemplifying RS patterns according to an embodiment of the present invention.

In reference to FIG. 9, the available CRS position candidate regions may be the first to $n^{th}$ CRS position candidate regions because the filter classes of the first to third cells are 1.

Figure 10:
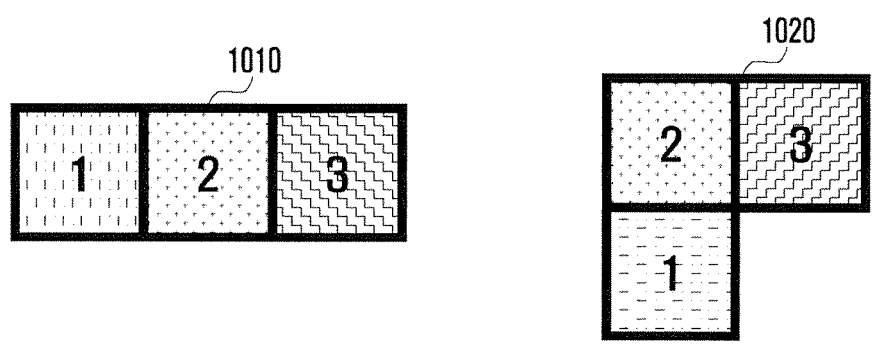

In this case, the eNB may determine to map the CRSs of the first to third cells to the first CRS position candidate regions in the simplest way. As shown in FIG. 9, it may be most compact to map the CRS to the regions arranged linearly as denoted by reference numbers 910, 920, and 930. In the embodiment of FIG. 10, however, although the CRSs are mapped to the regions arranged linearly as denoted by reference number 1010, it is not the most compact mapping because the time resource is constrained. Also, in the case as denoted by reference number 1020, the CRSs of the first and third cells are not mapped to the first CRS position candidate regions; thus, it is not the most compact mapping.

Figure 11:
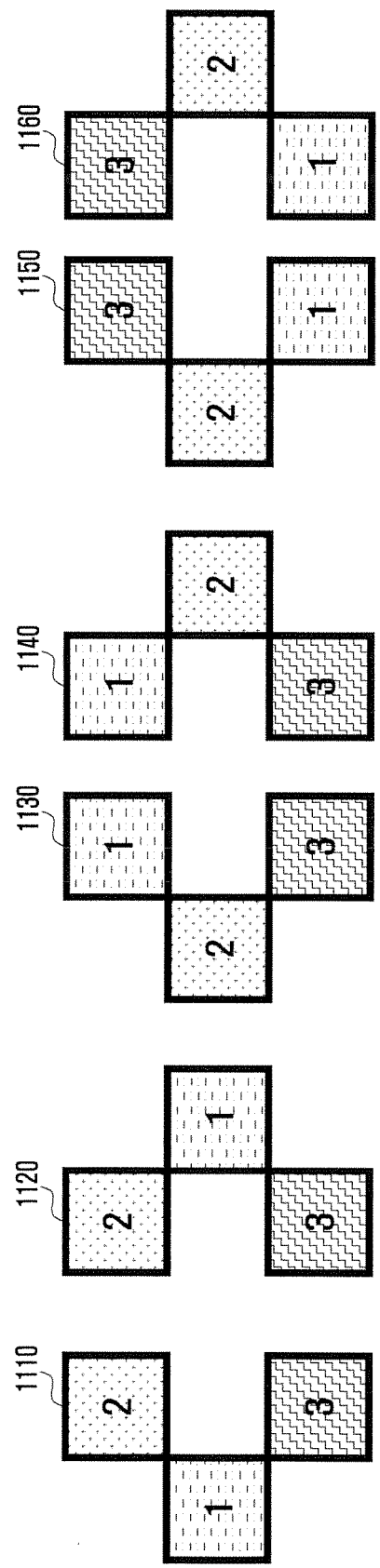
Figure 12:
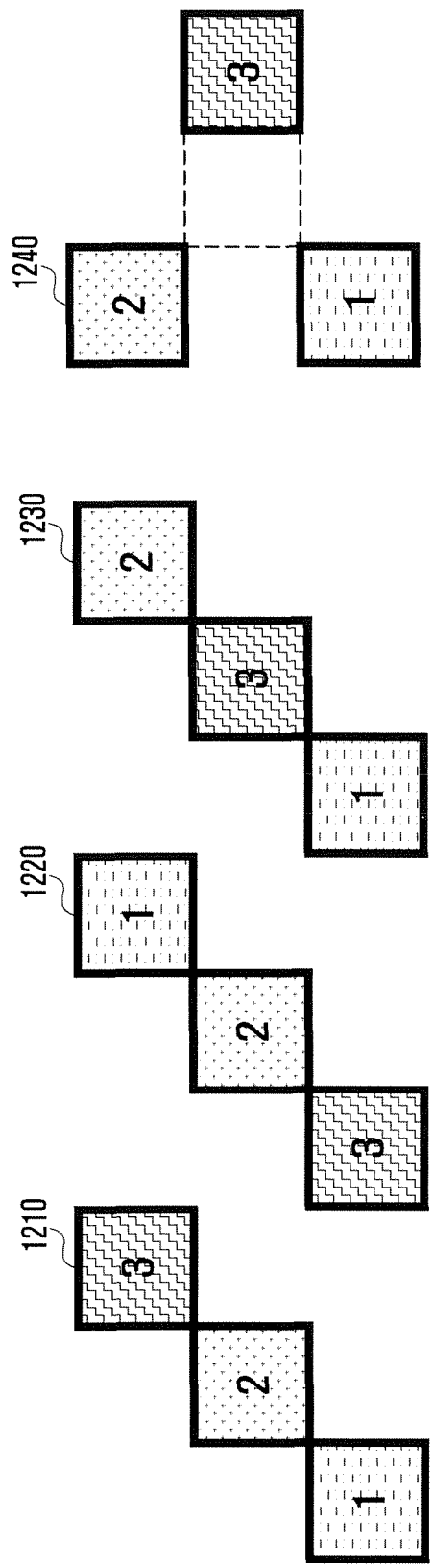

In reference to FIGS. 11 and 12, if there are first, second, and third cells of which filters are all categorized into filter class 2 (G1=2, G2=2, and G3=2), the eNB may determine the CRS pattern blocks. Here, if the first cell is the reference cell, the CRS position candidate regions of the second and third cells may be the first and second CRS position candidate regions because the filter class of the first cell is 2. Likewise, if the second cell is the reference cell, the CRS position candidate regions of the first and third cells may be the second and third CRS position candidate regions because the filter class of the second cell is 2. Likewise, if the third cell is the reference cell, the CRS position candidate regions of the first and third cells may be the second and third CRS position candidate regions because the filter class of the third cell is 2. Accordingly, the eNB may determine the most compact pattern. The determined pattern may be transmitted to the terminal (broadcast).

In reference to FIG. 11, the available CRS position candidate regions may be the first to $n^{th}$ CRS position candidate regions because the filter classes of the first to third cells are 2. In this case, the eNB may determine to map the CRSs of the first to third cells to the second CRS position candidate regions in the simplest way. As shown in FIG. 9, it may be most compact to map the CRS to the regions arranged diagonally as denoted by reference numbers 1110, 1120, 1130, 1140, and 1150. In the embodiment of FIG. 12, however, although the CRSs of the first to third cells are mapped to the regions arranged diagonally as denoted by reference numbers 1110, 1120, 1130, 1140, and 1150, it may not be the most compact mapping.

In more detail, if the first cell is the reference cell, the CRS position candidate regions of the second cell may be expressed as follows: CRS_BLK={[(0,0), (1,1)], [(0,0), (1,−1)], [(0,0), (−1,−1)], [(0,0), (−1,1)]}. Also, if the CRS position candidate regions of the third cell are added, they may be expressed as follows: CRS_BLK={[(0,0), (1,1), (1,−1)], [(0,0), (−1,1), (−1,−1)], [(0,0), (−1,−1), (0,−2)], [(0,0), (1,−1), (0,−2)], [(0,0), (−1,1), (0,2)], [(0,0), (1,1), (0,2)], [(0,0), (1,1), (2,2)], [(0,0), (−1,−1), (−2,−2)], [(0,0), (2,2), (1,1)], [(0,0), (0,2), (2,1)]}. The eNB may determine the most compact pattern among the patterns including the CRS position candidate regions of the third cell and notify the terminal of the most compact pattern.

In reference to FIGS. 13 and 14, if there are the first and third cells having the filters of filter class 1 and the second cell having the filter of filter class 2 (G1=1, G2=2, and G3=1), the eNB may determine the CRS pattern blocks. At this time, if the first cell is the reference cell, the CRS position candidate regions of the second and third cells may be the first, second, and third CRS position candidate regions because the filter class of the first cell is 1. Meanwhile, if the second cell is the reference cell, the CRS position candidate regions of the first and third cells may be the second and third CRS position candidate regions because the filter class of the second cell is 2. If the third cell is the reference cell, the CRS position candidate regions of the first and third cells may be the first, second, and third CRS position candidate regions because the filter class of the third cell is 1. Accordingly, the eNB may determine the most compact pattern. The determined pattern may be transmitted to the terminal (broadcast).

In reference to FIG. 13, the available CRS position candidate regions may be determined according to the filter class because the filter classes of the first and third cells are 1 and the filter class of the second cell is 2. Accordingly, the CRSs may be mapped to the regions 1310, 1315, 1320, 1325, 1330, 1335, 1340, 1345, 1350, 1355, 1360, 1365, 1370, and 1375 as shown in FIG. 13. However, mapping the CRSs to the regions 1410, 1420, 1430, 1440, 1450, and 1460 of FIG. 14 may not be the most compact mapping.

FIG. 15 is a diagram exemplifying multi-cell cooperative RS designs according to an embodiment of the present invention.

The above description has been directed to the method for generating an RS pattern building block.

A description is made of the method for configuring an RS pattern using the generated RS pattern building block.

Figure 16:
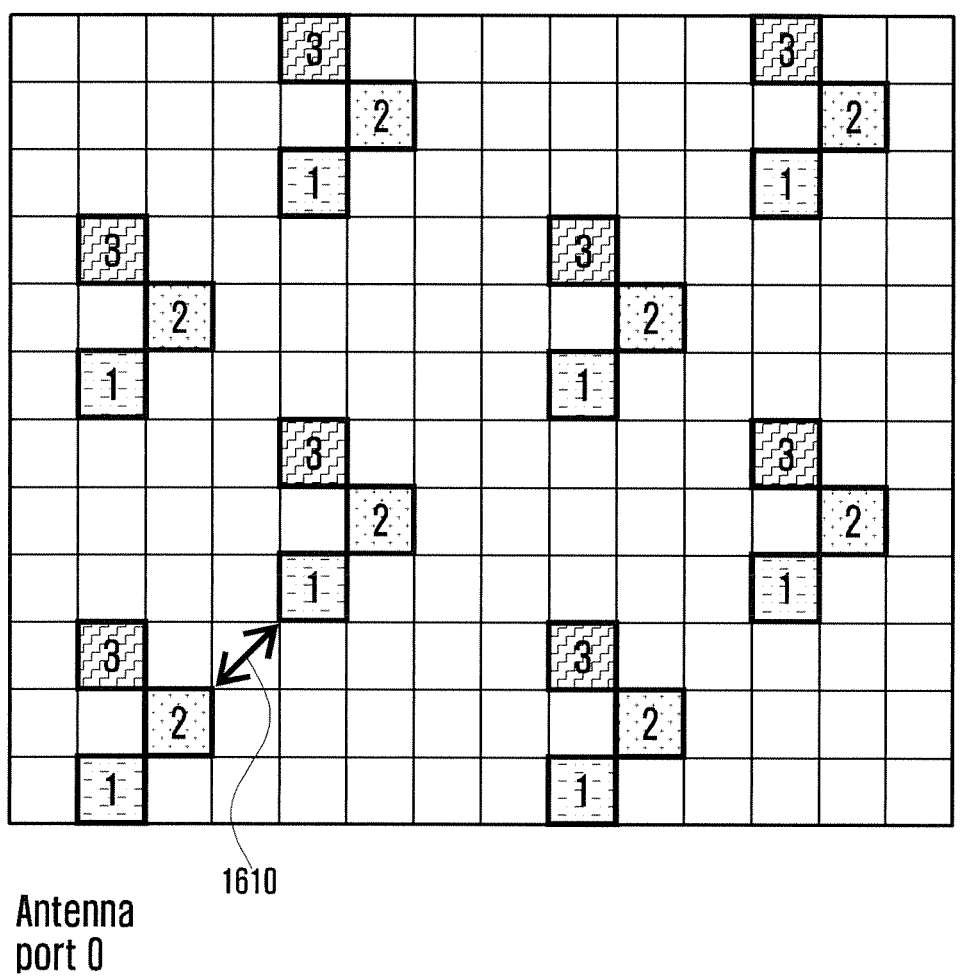
FIGS. 16 and 17 are diagrams illustrating methods for generating an RS pattern building block according to an embodiment of the present invention.
Figure 17:
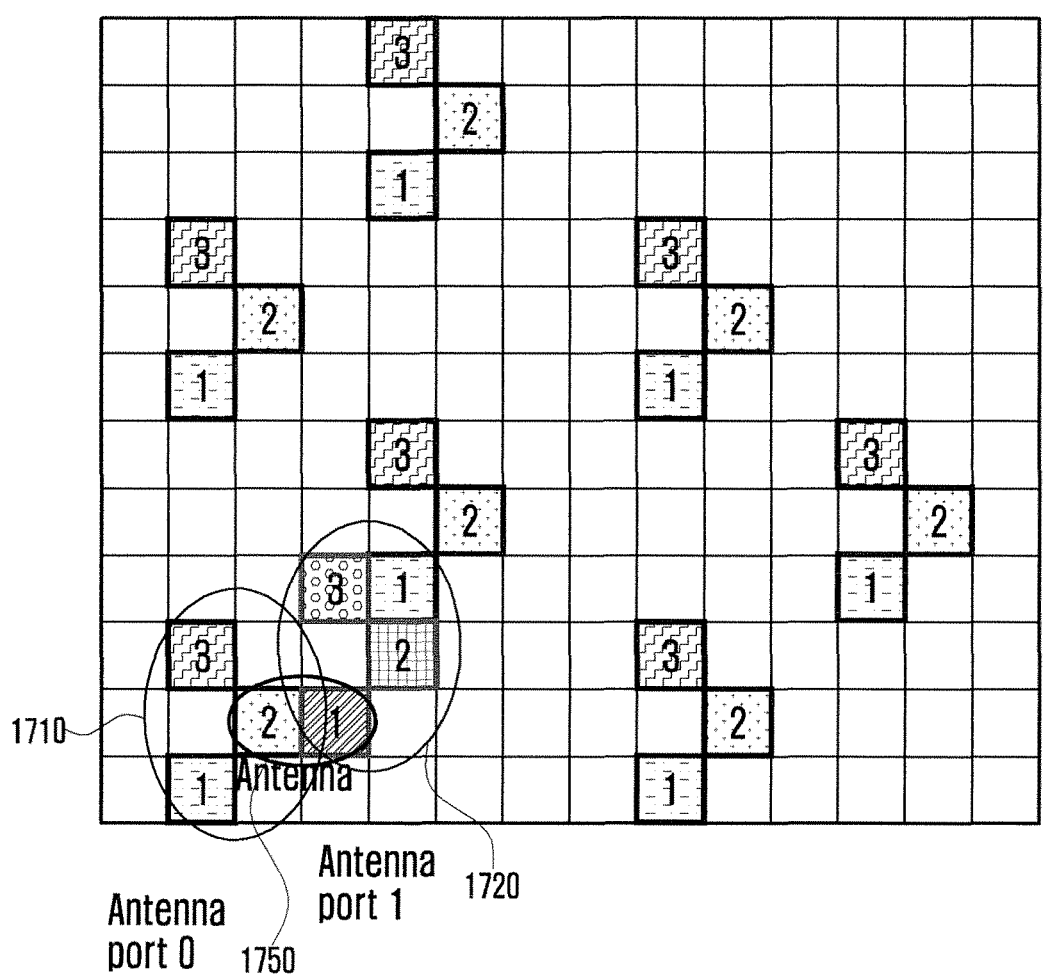
Figure 18:
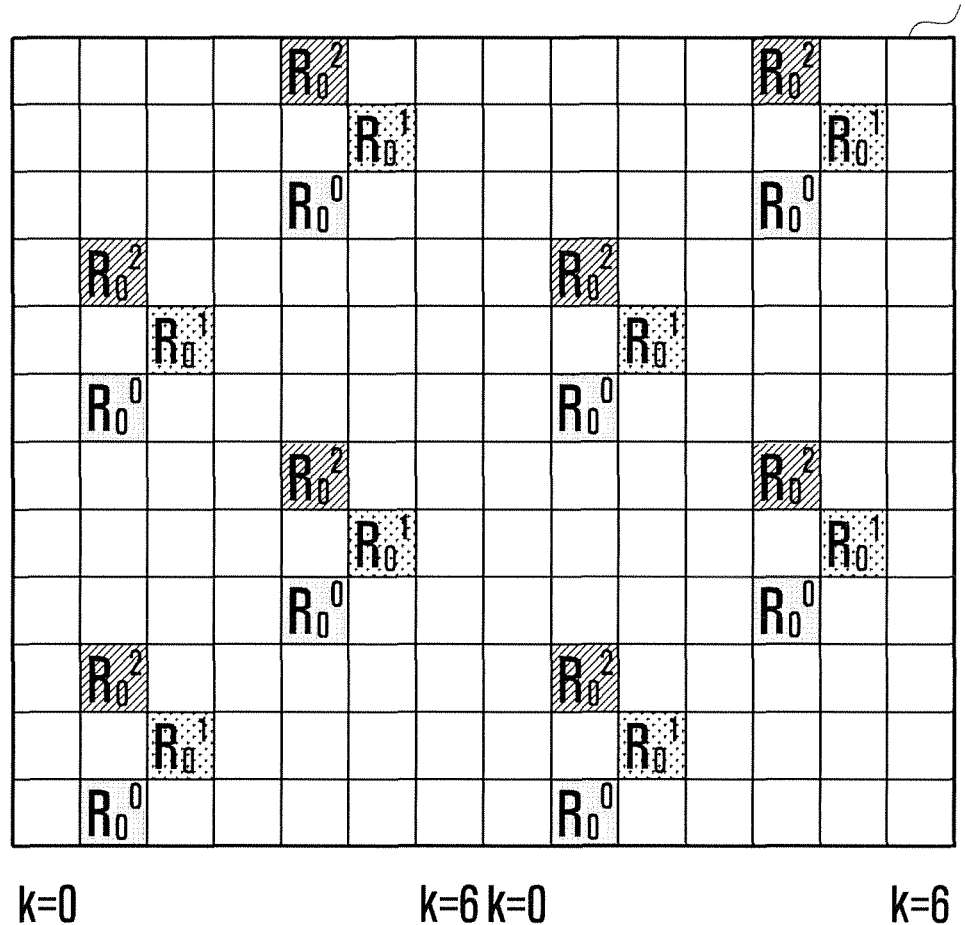
FIGS. 18 to 20 are diagrams illustrating exemplary RS patterns according to an embodiment of the present invention.
Figure 19:
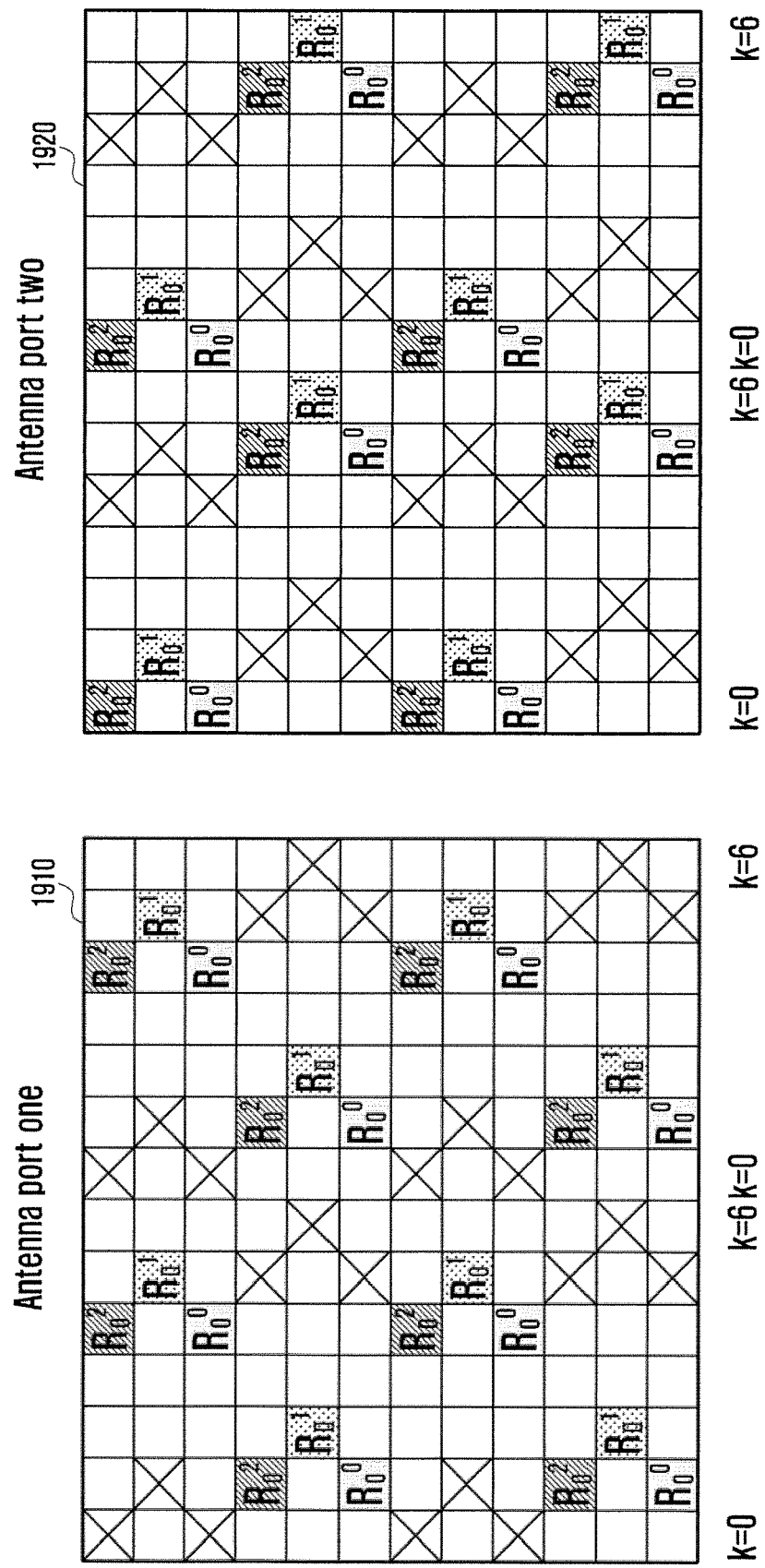
Figure 20:
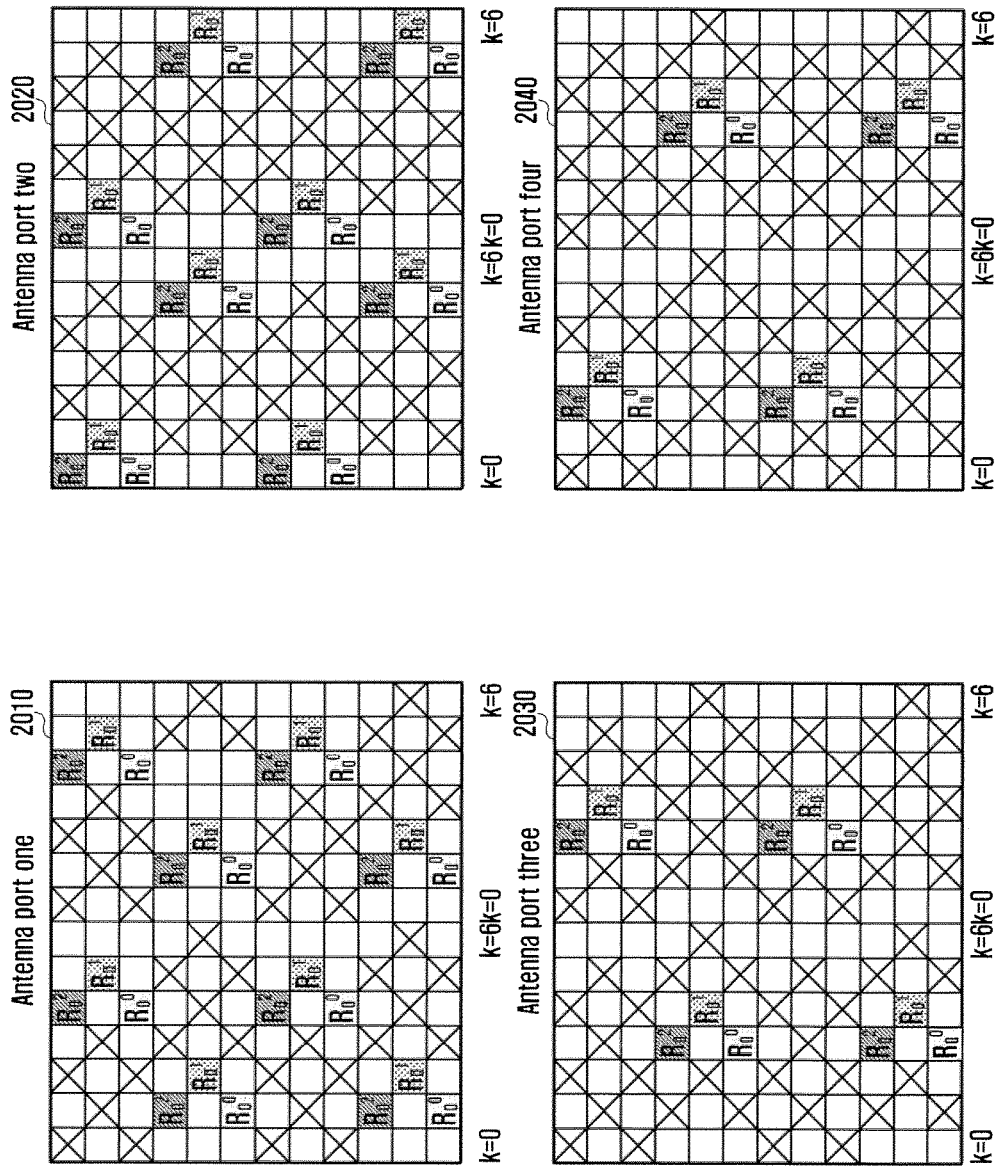

FIGS. 16 and 17 are diagrams illustrating methods for generating an RS pattern building block according to an embodiment of the present invention, and FIGS. 18 to 20 are diagrams illustrating exemplary RS patterns according to an embodiment of the present invention.

In reference to FIG. 16, it is possible to configure an RS pattern using the RS pattern building block. In this case, the RS pattern may be determined based on the cell identifier, filter class identifier, and RB size. As denoted by reference number 1610 of FIG. 16, it may be possible to determine the shifting amount of the RS pattern building block on the time and frequency axes. Unlike the conventional method in which shifting by as much as one RE on the time axis is allowed, in the FBMC scenario it may be possible to perform shifting in the time and/or frequency domains according to the filter class because the use of filters means that the frequency subcarriers are no longer vertical.

At this time, the RS pattern may be configured by taking the following into consideration. The frequency and time shifts in a given resource region may be determined according to the cell identifier (id). Notice should be taken of the nested property of the multi-antenna system so that the antenna port-specific and cell-specific RSs (CRS) are not mapped to the regions where interference is strong.

For this reason, the RS pattern building blocks may be arranged in such a way that the RSs of the different cells are shifted on the time and frequency axes to avoid being overlapped.

FIG. 17 shows a method for configuring an RS pattern for the case where there are the first and third cells having the filters of filter class 1 and the second cell having the filter of filter class 2 (G1=1, G2=2, and G3=1). At this time, if the $0^{th}$ RS pattern building block 1710 of the $0^{th}$ antenna port and the first RS pattern building block 1720 of the first antenna port are configured as shown in the drawing, the RS of the second cell of the $0^{th}$ RS pattern building block 1710 is mapped to a region where there is interference of the RS of the first cell in the first RS pattern building block 1720. It may also be shown as if the RS of the first cell of the first RS pattern building block 1720 is mapped to the region where there is interference of the RS of the second cell of the $0^{th}$ RS pattern building block 1710.

That is, it may be necessary to determine the distance between the RS pattern building blocks, arrange the RS pattern building blocks by antenna ports, and arrange the per-antenna port RS patterns so as not to be overlapped in series (this includes avoiding mapping signals to a region where interference is strong).

At this time, the time axis shift value and the frequency axis shift value may be defined as in equation (1).

$$T_{shift} = \text{Function (cell location ID, cell ID, RB size, filter class)}$$

$$F_{shift} = \text{Function (cell location ID, cell ID, RB size, filter class)} \quad \text{Equation 1}$$

FIGS. 18 to 20 are diagrams illustrating RS patterns for the case where the RB size is 7 and all of the filter classes of the first to third cells are 2. In this case, the frequency and time shifts may be calculated as shown in Table 2.

TABLE 2

The reference signal sequence $r_{l,ns}(m)$ shall be mapped to complex-valued modulation symbols $a_{k,l}^{(p)}$ used as reference symbols for antenna port p in in slot $n_s$ according to $$a_{k,i}^{(p)} = r_{l,ns}(m')$$

where $k = 6m + (v + v_{shift}) \bmod 6$ $$l = \begin{cases} 0, N_{symb}^{DL} - 3 & \text{if } p \in \{0, 1\} \\ 1 & \text{if } p \in \{2, 3\} \end{cases} \rightarrow l = \begin{cases} 1, N_{symb}^{DL} - 3, & \text{if } p = 0 \\ 0, N_{symb}^{DL} - 2, & \text{if } p = 1 \\ 3, & \text{if } p = 2, l = 0 \\ 2, & \text{if } p = 2, l \neq 0 \\ 2, & \text{if } p = 3, l = 0 \\ 3, & \text{if } p = 3, l \neq 0 \end{cases} + t_{shift}.$$

$m = 0, 1, \ldots, 2 \cdot N_{RB}^{DL} - 1$ $m' = m - N_{RB}^{maxDL} - N_{RB}^{DL}$ The variables v and $v_{shift}$ define the position in the frequency domain for the different reference signals where v is given by $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_2 \bmod 2) & \text{if } p = 2 \\ 3 + 3(n_2 \bmod 2) & \text{if } p = 3 \end{cases}$$

The cell-specific frequency shift is given by $v_{shift} = \boxed{N_{ID}^{cell} \bmod 6.} \rightarrow \begin{array}{l} t_{shift} = N_{ID}^{cell} \bmod 2 \\ v_{shift} = N_{ID}^{cell} \bmod 6 \end{array}$

---

The RS pattern for one antenna port may be configured as denoted by reference number 1810 of FIG. 18. Also, the RS patterns for each of two antenna ports may be configured as denoted by reference numbers 1910 and 1920, respectively, of FIG. 19. Also, the RA patterns for each of four antenna ports may be configured as denoted by reference numbers 2010, 2020, 2030, and 2040, respectively, of FIG. 20.

The above description has been directed to the method for configuring RS patterns using the generated RS pattern blocks.

A description is made hereinafter of the efficiency of the methods according to the present invention.

Figure 21:
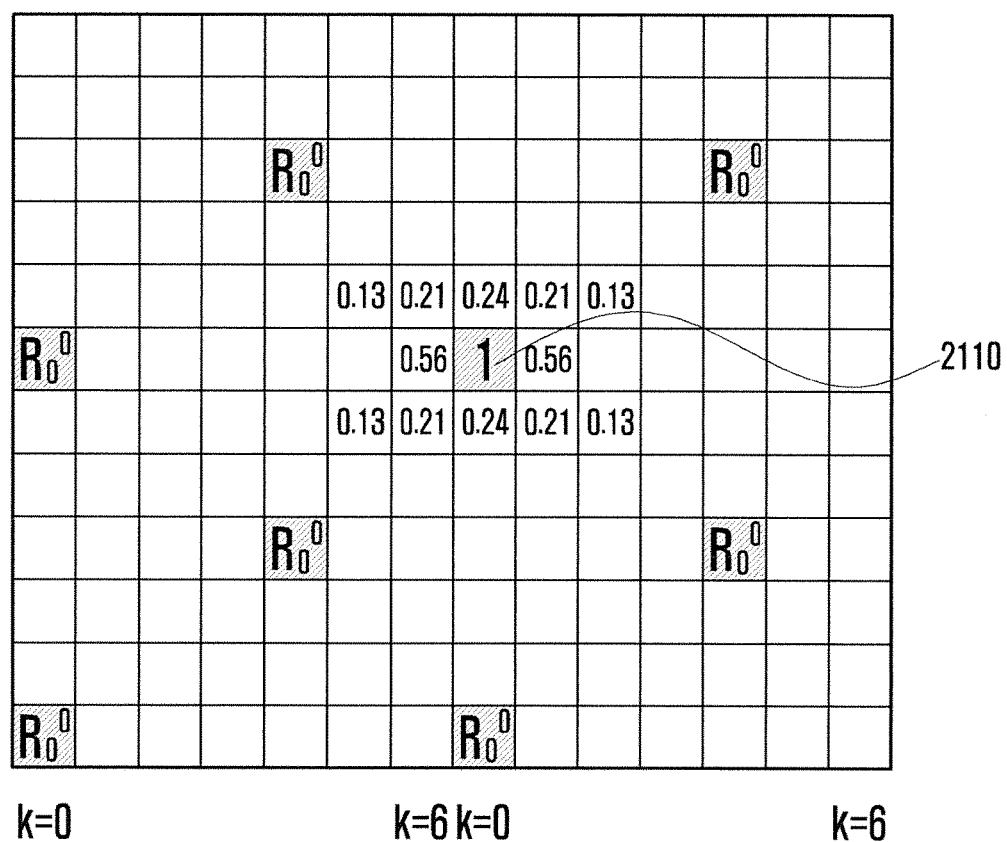
FIG. 21 is a diagram illustrating a method for calculating interference amounts at regions around an RS.
Figure 23:
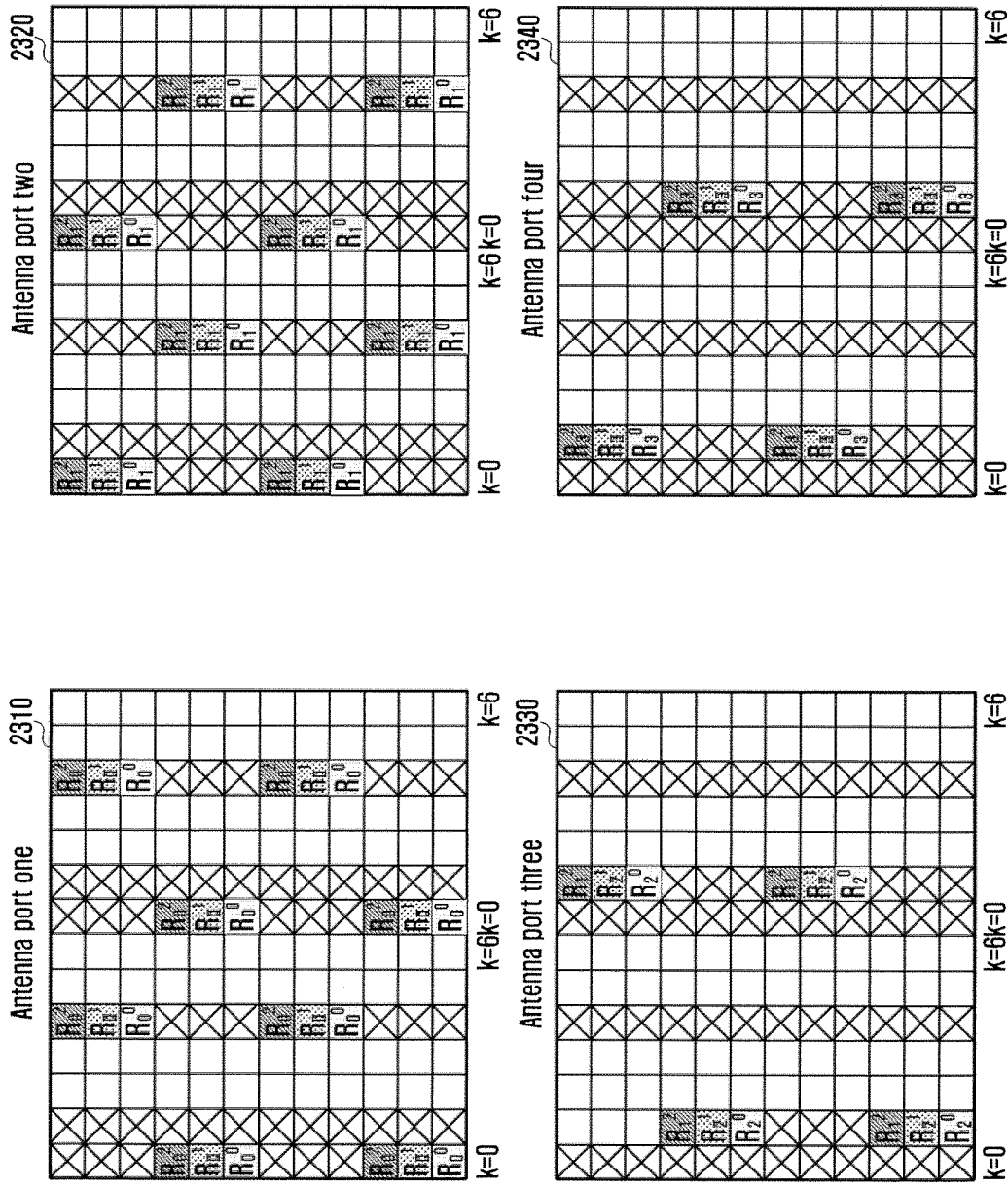
Figure 24:
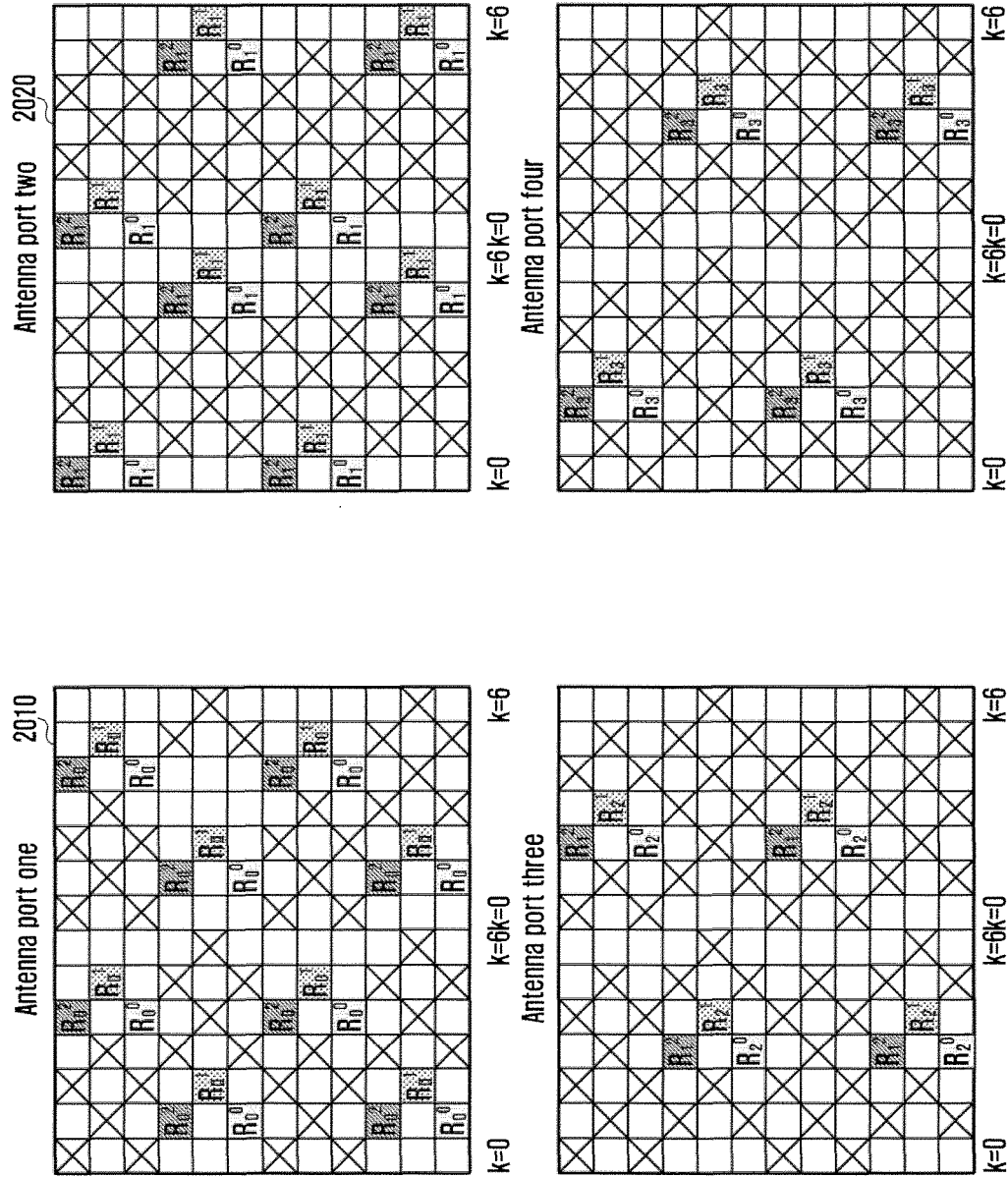

FIG. 21 is a diagram illustrating a method for calculating interference amounts at regions around an RS, and FIGS. 22 to 24 are diagrams for explaining efficiency in the case of using the method according to an embodiment of the present invention.

In reference to FIG. 21, the CRS 2110 is transmitted at a power stronger than that of the neighboring data symbols. For this reason, the RS becomes the main interference aggressor to the data symbols.

At this time, if the RSs are arranged according to the conventional technology as shown in FIG. 22, the interference amount Interf incurred to the RS may be equal to 0.0768 P ($=0.24^2*4/3$). Meanwhile, if the RSs are arranged according to one of the present invention as shown in FIG. 23, the interference amount Interf incurred to the RS may be equal to 0.0588 P ($=0.21^2*4/3$). This shows that the interference amount is reduced by as much as 23.43% in comparison with the conventional technology.

Similarly, if the RSs for 4 antenna ports are arranged according to the conventional technology as shown in FIG. 23, the interference amount Interf incurred to the RS may be equal to 0.3147 P ($=((0.24^2+0.56^2+0.24^2)*40+(0.24^2+0.24^2)*20+(0.24^2+0.56^2)*8+0.24^2*4)/72$). However, if the RSs are arranged according to an embodiment of the present invention as shown in FIG. 24, the interference amount Interf incurred to the RS may be equal to 0.0588 P ($=0.21^2*4/3$). This shows that the interference amount is reduced by as much as 81.32% in comparison with the conventional technology.

Figure 25:
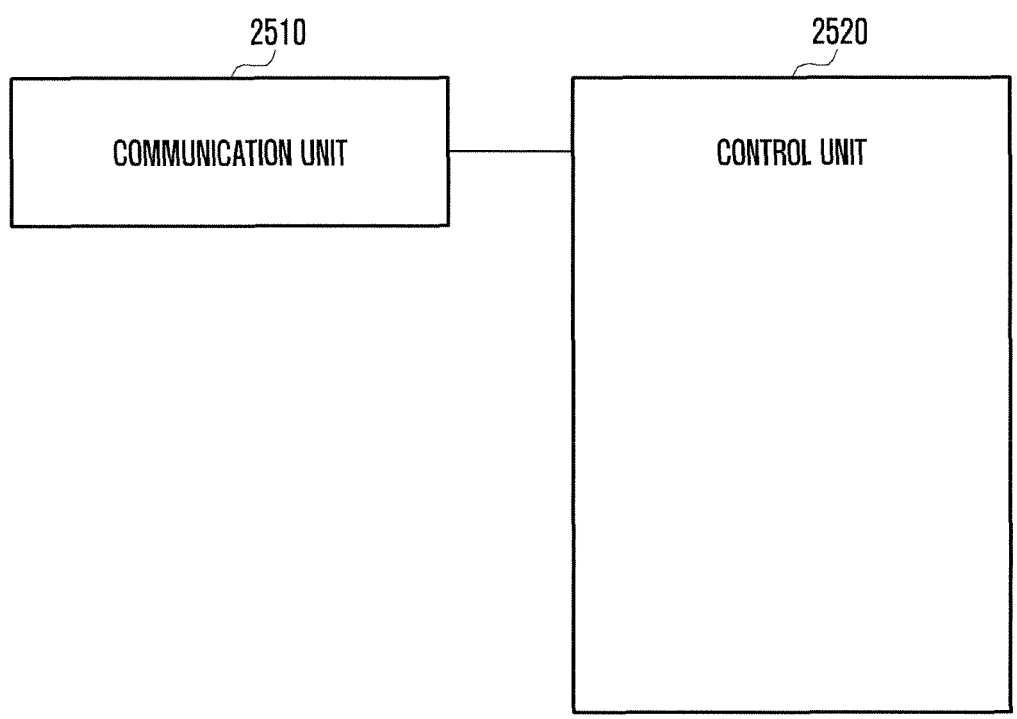
FIG. 25 is a block diagram illustrating a configuration of an eNB according to an embodiment of the present invention.

FIG. 25 is a block diagram illustrating a configuration of an eNB according to an embodiment of the present invention.

In reference to FIG. 25, the eNB according to an embodiment of the present invention may include a communication unit 2510 and a control unit 2520, which controls overall operations of the eNB.

The control unit 2520 of the eNB may control the eNB to perform the operation of one of the above-described embodiments. For example, the control unit 2520 may determine Reference Signal (RS) pattern building blocks of multiple cells based on the filter information of the cells, configure the RS patterns of the cells using the RS pattern building block and Resource Block (RB) size, and control the eNB to transmit the information on the RS pattern to a terminal.

The communication unit 2510 of the eNB transmits/receives signals according to one of the above-described embodiments.

Figure 26:
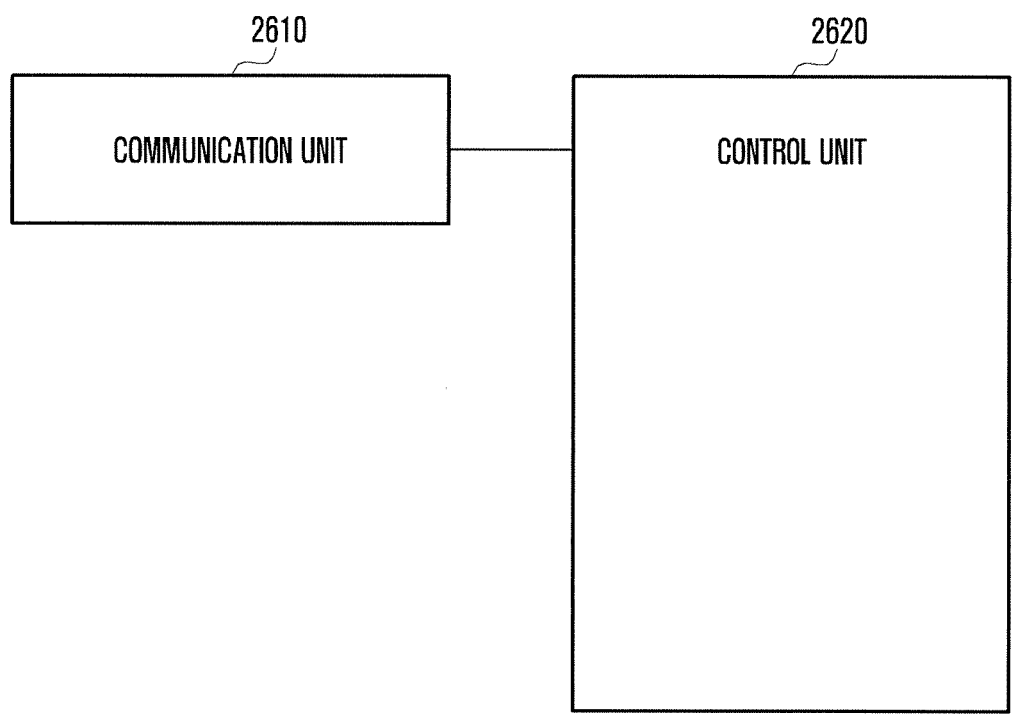
FIG. 26 is a block diagram illustrating a configuration of a terminal according to an embodiment of the present invention.

FIG. 26 is a block diagram illustrating a configuration of a terminal according to an embodiment of the present invention.

In reference to FIG. 26, the terminal according to an embodiment of the present invention may include a communication unit 2610 and a control unit 2620 for controlling overall operations of the terminal.

The control unit 2620 of the terminal controls the terminal to perform the operation of one of the above-described embodiments. For example, the control unit 2620 may control the terminal to receive information on the Reference Signal (RS) patterns of multiple cells from an eNB and then receive RSs based on the RS pattern information.

The communication unit 2610 of the terminal transmits/receives signals according to one of the above-described embodiments.

Although various embodiments have been described with specific examples to help understand the present invention, the specification and drawings are to be regarded in an illustrative rather than a restrictive sense. It is obvious to those skilled in the art that various modifications and changes can be made thereto without departing from the broader spirit and scope of the invention.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method of a base station, the method comprising:
   determining Reference Signal (RS) pattern building blocks of multiple cells according to per-cell filter information;
   configuring RS patterns of the cells based on the RS pattern building blocks and a Resource Block (RB) size; and
   transmitting information on the RS patterns to a terminal.

2. The method of claim 1, wherein determining the RS pattern building blocks comprises:
   comparing interference amounts of the per-cell filters with at least one predetermined interference threshold value;
   determining RS density information including RS position candidate regions; and
   determining the RS pattern building blocks based on the RS density information.

3. The method of claim 2, wherein configuring the RS patterns comprises determining the RS patterns based on the RS density information, RB size, and cell identity information.

4. The method of claim 1, wherein configuring the RS patterns comprises determining a shift value on at least one of time and frequency axes between the RS pattern building blocks.

5. The method of claim 1, wherein configuring the RS patterns comprises arranging, when a plurality of antenna ports exist, per-antenna port RS pattern building blocks, the per-antenna port RS pattern building blocks being not overlapped.

6. The method of claim 1, wherein the RS is a Cell-specific RS (CRS).

7. A method of a terminal, the method comprising:
   receiving information on Reference Signal (RS) patterns of multiple cells from a base station; and
   receiving RSs based on the information on the RS patterns,
   wherein the information on the RS patterns is determined based on RS pattern building blocks determined according to per-cell filter information and Resource Block (RB) size.

8. A base station comprising:
   a transceiver configured to transmit and receive a signal; and
   a controller configured to:
   determine Reference Signal (RS) pattern building blocks of multiple cells according to per-cell filter information,
   configure RS patterns of the cells based on the RS pattern building blocks and a Resource Block (RB) size, and
   transmit information on the RS patterns to a terminal.

9. The base station of claim 8, wherein the controller is further configured to:
   compare interference amounts of the per-cell filters with at least one predetermined interference threshold value,
   determine RS density information including RS position candidate regions, and
   determine the RS pattern building blocks based on the RS density information.

10. The base station of claim 9, wherein the controller is further configured to determine the RS patterns based on the RS density information, RB size, and cell identity information.

11. The base station of claim 8, wherein the controller is further configured to determine a shift value on at least one of time and frequency axes between the RS pattern building blocks.

12. The base station of claim 8, wherein the controller is further configured to arrange, when a plurality of antenna ports exist, per-antenna port RS pattern building blocks, the per-antenna port RS pattern building blocks being not overlapped.

13. The base station of claim 8, wherein the RS is a Cell-specific RS (CRS).

14. A terminal comprising:
   a transceiver configured to transmit and receive a signal; and
   a controller configured to:
   receive information on Reference Signal (RS) patterns of multiple cells from a base station, and
   receive RSs based on the information on the RS patterns,
   wherein the information on the RS patterns is determined based on RS pattern building blocks determined according to per-cell filter information and Resource Block (RB) size.

15. The terminal of claim 14, wherein the RS is a Cell-specific RS (CRS).

* * * * *